(12) United States Patent
Tavildar et al.

(10) Patent No.: US 8,855,134 B2
(45) Date of Patent: Oct. 7, 2014

(54) NETWORK-ASSISTED PEER DISCOVERY

(75) Inventors: Saurabha Rangrao Tavildar, Jersey City, NJ (US); Aleksandar Jovicic, Jersey City, NJ (US); Shailesh Patil, Bridgewater, NJ (US); Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 13/558,086

(22) Filed: Jul. 25, 2012

(65) Prior Publication Data

US 2014/0029471 A1    Jan. 30, 2014

(51) Int. Cl.
   *H04J 3/26*       (2006.01)
   *H04W 8/00*       (2009.01)
   *H04W 48/16*      (2009.01)
   *H04L 29/08*      (2006.01)
   *H04W 4/00*       (2009.01)
   *H04W 4/20*       (2009.01)
   *H04W 4/02*       (2009.01)

(52) U.S. Cl.
   CPC ............. *H04W 48/16* (2013.01); *H04W 4/008* (2013.01); *H04W 4/20* (2013.01); *H04W 8/005* (2013.01); *H04L 67/1063* (2013.01); *H04W 4/023* (2013.01)
   USPC ............................ 370/432; 370/328; 370/338

(58) Field of Classification Search
   None
   See application file for complete search history.

(56) References Cited

U.S. PATENT DOCUMENTS

| | | | |
|---|---|---|---|
| 8,144,589 B2 | 3/2012 | Meylan et al. | |
| 2008/0037487 A1* | 2/2008 | Li et al. | 370/338 |
| 2009/0287827 A1* | 11/2009 | Horn et al. | 709/227 |
| 2009/0323648 A1 | 12/2009 | Park et al. | |
| 2010/0165882 A1 | 7/2010 | Palanki et al. | |
| 2010/0303008 A1* | 12/2010 | Wietfeldt et al. | 370/328 |
| 2011/0243060 A1* | 10/2011 | Mildh et al. | 370/315 |
| 2011/0258313 A1 | 10/2011 | Mallik et al. | |
| 2011/0268101 A1* | 11/2011 | Wang et al. | 370/344 |
| 2012/0113967 A1* | 5/2012 | Smith et al. | 370/338 |
| 2012/0115518 A1* | 5/2012 | Zeira et al. | 455/500 |
| 2013/0329711 A1* | 12/2013 | Seo et al. | 370/336 |

FOREIGN PATENT DOCUMENTS

| | | |
|---|---|---|
| EP | 1777916 A1 | 4/2007 |
| EP | 1972174 | 2/2011 |
| WO | WO-2008137959 A2 | 11/2008 |

OTHER PUBLICATIONS

International Search Report and Written Opinion—PCT/US2013/051820—ISA/EPO—Dec. 4, 2013.

* cited by examiner

*Primary Examiner* — Duc C Ho
(74) *Attorney, Agent, or Firm* — Joseph B. Agusta

(57) ABSTRACT

Techniques for transmitting information in a long term evolution (LTE) wireless communication network are disclosed. A base station may receive a first user equipment (UE) expression and first UE location information of a UE seeking peers. The base station may also receive a second UE expression and second UE location information of at least one of the peers. In accordance with the first and second UE expressions and the first and second UE location information, the base station may match ones of the peers proximate to the UE. The base station may transmit, using a data exchange efficiency technique, information to alert the UE to the presence of the peers. This transmission may comprise wide area network (WAN)-specific signaling.

46 Claims, 18 Drawing Sheets

NETWORK-ASSISTED PEER DISCOVERY

BACKGROUND

I. Field

The present disclosure relates generally to communication, and more specifically to techniques for supporting peer-to-peer (P2P) communication.

II. Background

Wireless communication networks are widely deployed to provide various communication content, such as voice, video, packet data, messaging, broadcast, and the like. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of base stations that can support communication for a number of devices. A device may communicate with a base station via the downlink and uplink. The downlink (or forward link) refers to the communication link from the base station to the device, and the uplink (or reverse link) refers to the communication link from the device to the base station. The device may also be able to communicate peer-to-peer (P2P) with other devices. It may be desirable to efficiently support P2P communication between devices.

SUMMARY

The present disclosure provides techniques for performing network-assisted peer discovery.

In an embodiment, apparatus, computer programs, methods and systems for transmitting information in an LTE wireless communication network are provided. In such an embodiment, a base station may receive a first user equipment (UE) expression and first UE location information of a UE seeking peers. The base station may also receive a second UE expression and a second UE location information of at least one of the peers. In accordance with the first and second UE expressions and the first and second UE location information, the base station may match ones of the peers proximate to the UE. The base station may transmit, using a data exchange efficiency technique, information to alert the UE to the presence of the peers. This transmission may comprise WAN-specific signaling.

The data exchange efficiency techniques for the transmission of information from the base station may be selected from the group of using a paging channel and using semi-persistent scheduling. The transmission of information from the base station may also comprise the use of a broadcast channel. The WAN-specific signaling may comprise the use of a UDP protocol, which may be used in one of several communication layers (e.g. the MAC layer and lower-layer signaling).

In another embodiment, a first UE seeking peers may transmit its first UE expression and first location information. The first UE may also transmit a requested match of a second UE expression of at least one of the peers. The first UE may receive a match in response to the request to alert the first UE to the presence of the matched peer or peers.

The data exchange efficiency techniques for the reception of information from the base station may be selected from the group of using a random access channel and using semi-persistent scheduling. The semi-persistent scheduling may comprise scheduling with sounding reference signals. The WAN-specific signaling may comprise the use of a UDP protocol, which may be used in one of several communication layers (e.g. the MAC layer and lower-layer signaling).

DETAILED DESCRIPTION

The figures and descriptions of the disclosure have been simplified to illustrate elements that are relevant for clear understanding, while eliminating, for the purposes of clarity and brevity, other elements found in typical telecommunications apparatuses, systems and methods. Those of ordinary skill in the art will thus recognize the other elements and/or steps that are desirable and/or required in implementing the disclosure. However, because such elements and steps are well known in the art, and because they do not facilitate a better understanding of the present invention, a discussion of such elements and steps is not provided herein. The disclosure herein is nevertheless directed to all variations and modifications to the disclosed elements and steps that will be known or apparent to those skilled in the art in light of this disclosure.

The techniques described herein may be used for various wireless communication networks, such as CDMA, TDMA, FDMA, OFDMA, SC-FDMA, and other wireless networks. The terms "network" and "system" are often used interchangeably herein. By way of example, a CDMA network may implement a radio technology such as Universal Terrestrial Radio Access (UTRA), cdma2000, and the like. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology, such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, and the like. UTRA and E-UTRA are part of Universal Mobile Telecommunication System (UMTS). 3GPP Long Term Evolution (LTE) and LTE-Advanced (LTE-A), in both Frequency Division Duplex (FDD) and Time Division Duplex (TDD), are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above, as well as for other wireless networks and radio technologies.

Figure 1:
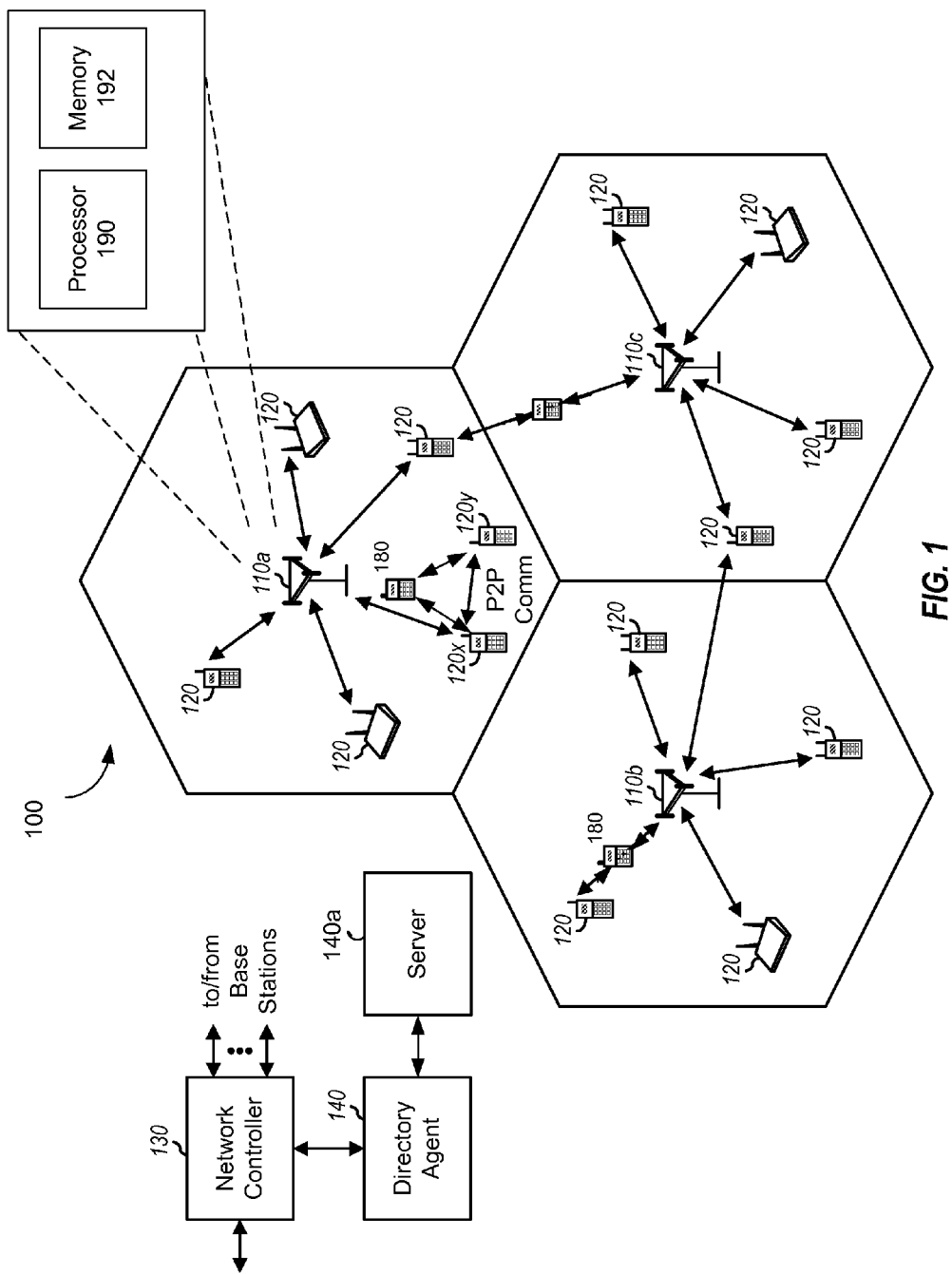
FIG. 1 shows a wireless communication network, which may be an LTE network or other wireless network according to embodiments of the present disclosure.

FIG. 1 shows a wireless communication network 100, which may be a LTE network or other wireless network (also referred to herein as a wide area network, or WAN, or simply as a network). Wireless communication network 100 may include a number of base stations and other network entities. For simplicity, only three base stations 110a, 110b, and 110c, one network controller 130, and a directory agent 140 are shown in FIG. 1. A base station may be an entity that communicates with the devices and may also be referred to as a Node B, an evolved Node B (eNB), an access point, for example. Each base station 110 may provide communication coverage for a particular geographic area, and may support communication for the devices located within the coverage area. To improve network capacity, the overall coverage area of a base station may be partitioned into multiple (e.g., three in the illustration) smaller areas. Each smaller area may be served by a respective base station subsystem. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

WAN 100 may be a heterogeneous network (HetNet) that includes base stations of different types, for example, macro base stations, pico base stations, home base stations, relays, and the like. For example, a base station may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, WAN 100 includes macro base stations 110a, 110b, and 110c for correspondent macro cells. WAN 100 may also include pico base stations for pico cells, and/or home base stations for femto cells (not shown in FIG. 1).

Network controller 130 may couple to one or more base stations, and may provide coordination and control for these base stations. Network controller 130 may be a single network entity or a collection of network entities. Network controller 130 may communicate with the base stations via a backhaul, by way of non-limiting example. The base stations may also communicate with one another, for example, directly or indirectly via wireless or wireline backhaul.

Directory agent 140 may be a separate network entity and may be coupled to network controller 130 (as shown in FIG. 1) and/or to other network entities. Directory agent 140 may also be part of a base station, or network controller 130, or some other network entity (not shown in FIG. 1). Directory agent may further include, or be communicatively associated with, server 140a. Directory agent 140 may support peer discovery by devices, such as by providing certain identifying information of user devices, as described further below. Directory agent 140 may also be referred to by other names.

Processor/controller 190 may be associated with, or form part of, network controller 130. Of further note, processor/controller may be, form part of, or be distinct from, server 140a, and may be associated with a correspondent memory 192 that may be, form part of, or be distinct from, directory agent 140. Processor/controller 190 may include comparator capabilities, assessing capabilities, and like processing capabilities, and may be associated with information stored in a memory within, or associated with, directory agent 140. As such, processor/controller 190 may be within a base station 110a, and may provide the processing and calculation functions described herein.

Devices 120 may be dispersed throughout the wireless network, and each device may be stationary or mobile. A device may also be referred to as a user equipment (UE), a user device, a mobile station, a terminal, an access terminal, a subscriber unit, a station, etc. A device may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, a peripheral device (e.g., a printer), and the like. A device may communicate with a base station in a wireless network. A device may also communicate peer-to-peer (P2P) with other devices. In the example shown in FIG. 1, UEs 120x and 120y may communicate P2P, and remaining devices 120 may communicate with base stations 110a, 110b, 110c. UEs 120x and 120y may also be capable of communicating with the base stations, e.g., when not engaged in P2P communication or concurrently with P2P communication. P2P communication may be used to offload data traffic in order to reduce congestion on the radio interface, on WAN network 100, as well as on a core network.

WAN 100 may also include relays 180. A relay 180 may be any entity that receives a transmission of data from an upstream entity (e.g., a base station or a UE) and sends a transmission of the data to a downstream entity (e.g., a UE or a base station), that relays data, typically without modification. A relay may be a UE that relays transmissions for other UEs, a base station that relays transmissions, or any other independent relay device or node. Those skilled in the art will appreciate that relays may be included throughout the networks, cells and systems herein described.

In the description herein, WAN communication refers to communication between a UE and a base station, such as for a call between the UE and a remote entity, such as another UE, via the base station. A WAN link, and variants thereof, as used herein, thus refers to a communication link between a UE and a base station. In contrast, a P2P communication, as used herein, refers to direct communication between two or more UEs, wherein the direct communication typically occurs without going through a base station. A P2P link, or variants thereof, thus refers to a typically direct communication link between two or more UEs engaged in P2P communication. Correspondingly, a WAN UE is a UE that is interested or engaged in WAN communication, and a P2P UE is a UE that is interested or engaged in P2P communication.

A P2P group refers to a group of two or more UEs engaged in P2P communication. In one design, one UE in the P2P group may be designated as a P2P server (or a P2P group owner), and each remaining UE in the P2P group may be designated as a P2P client. The P2P server may perform certain management functions, such as exchanging signaling with a WAN, coordinating data transmission between the P2P server and the P2P client(s), and the like.

One challenge in P2P communication is discovery/detection of peer devices of interest within a particular range, e.g., within radio frequency (RF) range. Devices that can and/or desire to communicate peer-to-peer may perform peer discovery autonomously. For autonomous peer discovery, a device may occasionally (e.g., periodically) transmit a proximity detection signal (PDS) to announce its presence and to enable other devices to detect the device. Alternatively or additionally, the device may detect other devices near its proximity based on proximity detection signals transmitted by these other devices. A PDS may also be referred to as a peer detection signal, a peer discovery signal, etc. A PDS may comprise a pilot and may carry identification information for a transmitter of the proximity detection signal and/or other information. A pilot is a signal that is known a priori by a transmitter and a receiver and may also be referred to as a reference signal, or a preamble, for example.

For example, each device in a group of devices may transmit a PDS, and may also detect PDSs from other devices in the group. Each device may alternate between (i) a transmit state in which the device transmits its proximity detection signal, and (ii) a listen/receive state in which the device detects proximity detection signals from other devices. In another design, one device in a group of devices may be requested to transmit a PDS, and all other devices in the group may be requested to detect the PDS.

In general, a goal of peer discovery is to maximize the probability of peer detection while maintaining energy efficiency. For example, a device may occasionally transmit and/or receive PDS(s) in performing autonomous peer discovery, even when no other devices may be interested in, or available for, communicating with the device. This may result in significant battery power consumption by the device, which may degrade standby battery life of the device.

In an aspect, network-assisted peer discovery may be used to aid devices performing peer discovery, in order to increase efficiencies, such as by enhancing battery life by decreasing peer discovery time. In one design for network-assisted peer discovery, a device may register with a network entity (e.g., directory agent 140, and/or a communicatively associated base station 110a) so that the presence of the device and possibly other information about the device can be made known to the network entity. The network entity may collect similar information from other devices. The network entity may thus inform the device (and the other devices) when devices of interest to the device (e.g., a "buddy list") for P2P communication may be within the vicinity of the device. The device may then discover peers as a result of information provided by the network entity instead of constantly performing peer discovery autonomously at a certain interval, which may reduce power consumption for peer discovery, extend battery life of the device, and provide other benefits.

More particularly, in network-assisted peer discovery, UEs may transmit expressions (which may include the location of the UE) using WAN uplink channels and protocols to allow for network-assisted peer discovery to occur. Likewise, UEs may receive peer discovery information via WAN downlink channels and protocols for network-assisted peer discovery. Since base station 110a (such as in association with directory agent (DA) 140 and/or a server 140a associated with directory agent 140, which is also referred to collectively hereinafter as "base station with DA 110a") knows the buddy list of a particular UE, it may match the expression of the particular UE with the expressions that it receives from other UEs via the set of all uplink transmissions, and may thus download to the particular UE only the expressions of other UEs that are of interest to the particular UE based on information in the expression transmitted by the particular UE. Thereby, standby time of the UE is increased, at least because the UE does not need to stay online and listen to peer discovery signals coming from mobiles in which it is not interested.

Figure 2:
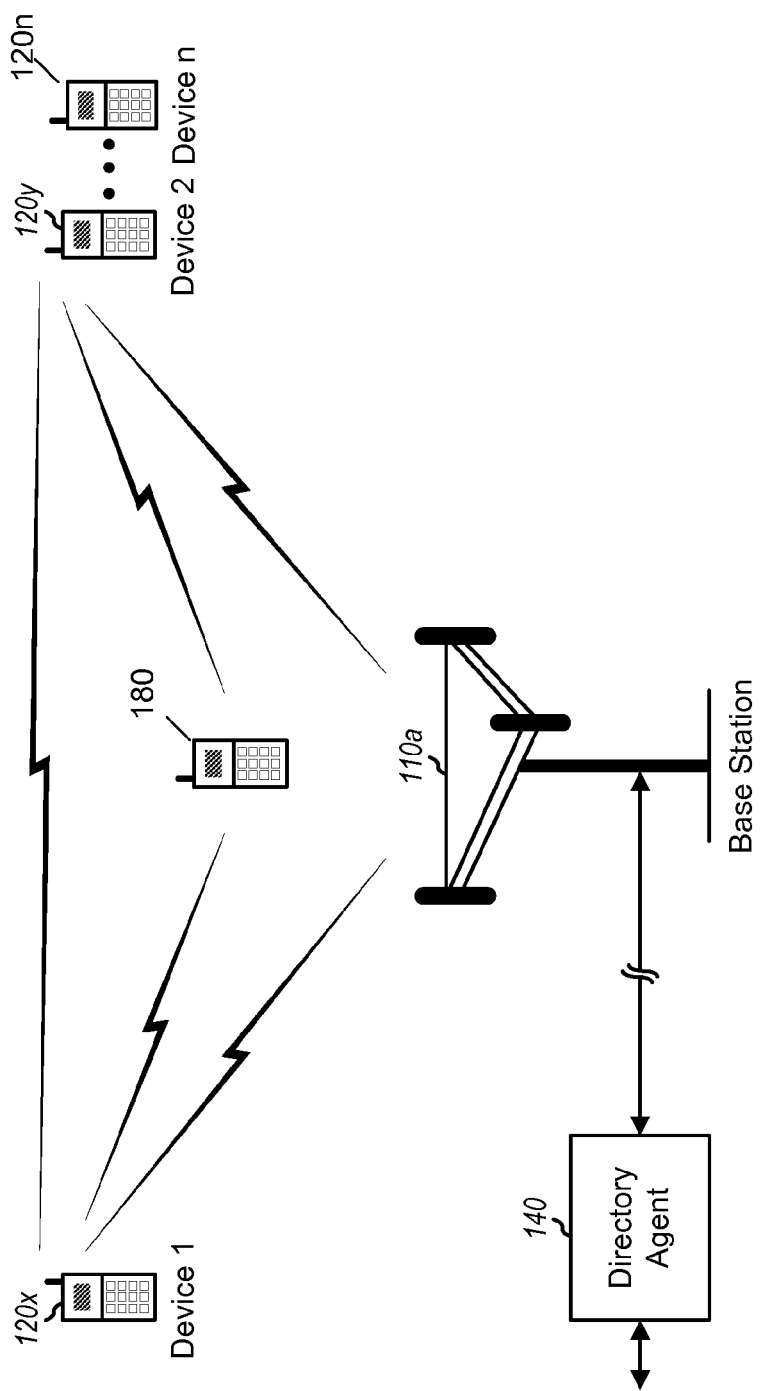
FIG. 2 shows communication between two devices, a base station, and a directory agent for network-assisted peer discovery according to embodiments of the present disclosure.

FIG. 2 shows communication between two UEs 120x and 120y and directory agent 140, such as via base station with DA 110a, for network-assisted peer discovery. UEs 120x and 120y may communicate with directory agent 140 via the same base station 110a, or via different base stations, for network-assisted peer discovery. UEs 120x and 120y may also communicate with base station 110a for WAN communication and also for scheduling of P2P communication. UEs 120x and 120y may transmit and receive proximity detection signals (also referred to as expressions) for peer discovery and may also communicate P2P. Base station 110a may be a serving base station of device 120x and/or 120y. Directory agent 140 may assist devices 120x and 120y with peer discovery.

Those skilled in the art will appreciate that there may be many UEs 120x, 120y . . . 120n operating within network 100. In many applications, such as, for example, social networking applications, UE 120x may have a buddy list from which it wishes to discover other UEs, such as UE 120y, that are proximate to UE 120x. To that end, UE 120x may broadcast and receive the afore-discussed peer discovery signals, may register with one or more components (such as base station with DA 110a) of network 100 and may receive registrations of other UEs therefrom, and may seek other known UEs that are proximate to the UE 120x in any other manner known to those skilled in the pertinent arts.

In an aspect, referred to above and herein as "registration" (and variants thereof), the UE may register with a non-peer network component. In this case, UE 120x may register itself with directory agent 140 (or some other designated network entity). For example, UE 120x may register with directory agent 140 via base station with DA 110a upon entering WAN coverage, e.g., upon detecting a macro cell in wireless network 100. UE 120x may also register with directory agent 140 to request one or more services, to advertise one or more services it is configured to provide, to query for peer devices near the vicinity of UE 120x, etc. Directory agent 140 may be communicatively associated with base station 110a in such embodiments, that is, directory agent 140 may or may not be part of wireless network 100.

UE 120x may provide pertinent information to directory agent 140 as part of registration. In one design, UE 120x may provide identification information identifying UE 120x, and/or service information identifying one or more services offered and/or requested by UE 120x, and/or location information for device 120x, etc. The identification information may comprise a device identity (ID), or "expression," unique to UE 120x. The expression may have a suitable length (e.g., 12 bits or some other number of bits) to ensure uniqueness with sufficiently high probability. The service information may include one or more service IDs for one or more services offered by UE 120x and/or one or more services requested by UE 120x. A number of services may be defined/supported, and each service may be assigned a different service ID to identify that service. A group of related services may also be defined and assigned a service ID. A service ID may be, form part of, or be distinct from the aforementioned expression, and may be a string or an index of a suitable length (e.g., 12 bits or some other number of bits) that can uniquely identify a service, a group of services, or all services. The location information may provide at least an approximate geographical location of UE 120x, and may be, form part of, or be distinct from the aforementioned expression. For example, the location information may provide a tracking area of UE 120x or the location of a serving base station of UE 120x as a coarse location of UE 120x. The location information may also provide an accurate location estimate for UE 120x, which may be obtained based on a Global Navigation Satellite System (GNSS) such as Global Positioning System (GPS).

In current designs, in addition to, or in the alternative to, the foregoing registration, peer UEs 120x and 120y may engage in synchronized P2P discovery, referred to herein generally as "direct peer discovery" (or variants thereof, such as through relay 180, for example). In direct peer discovery, peers may communicate directly, such as using an assigned peer discovery resource (e.g., a designated resource block or blocks, or a portion of a resource block or blocks, of an LTE subframe), to discover one another. Direct peer discovery may typically occur without aid of information at directory agent 140.

Figure 3:
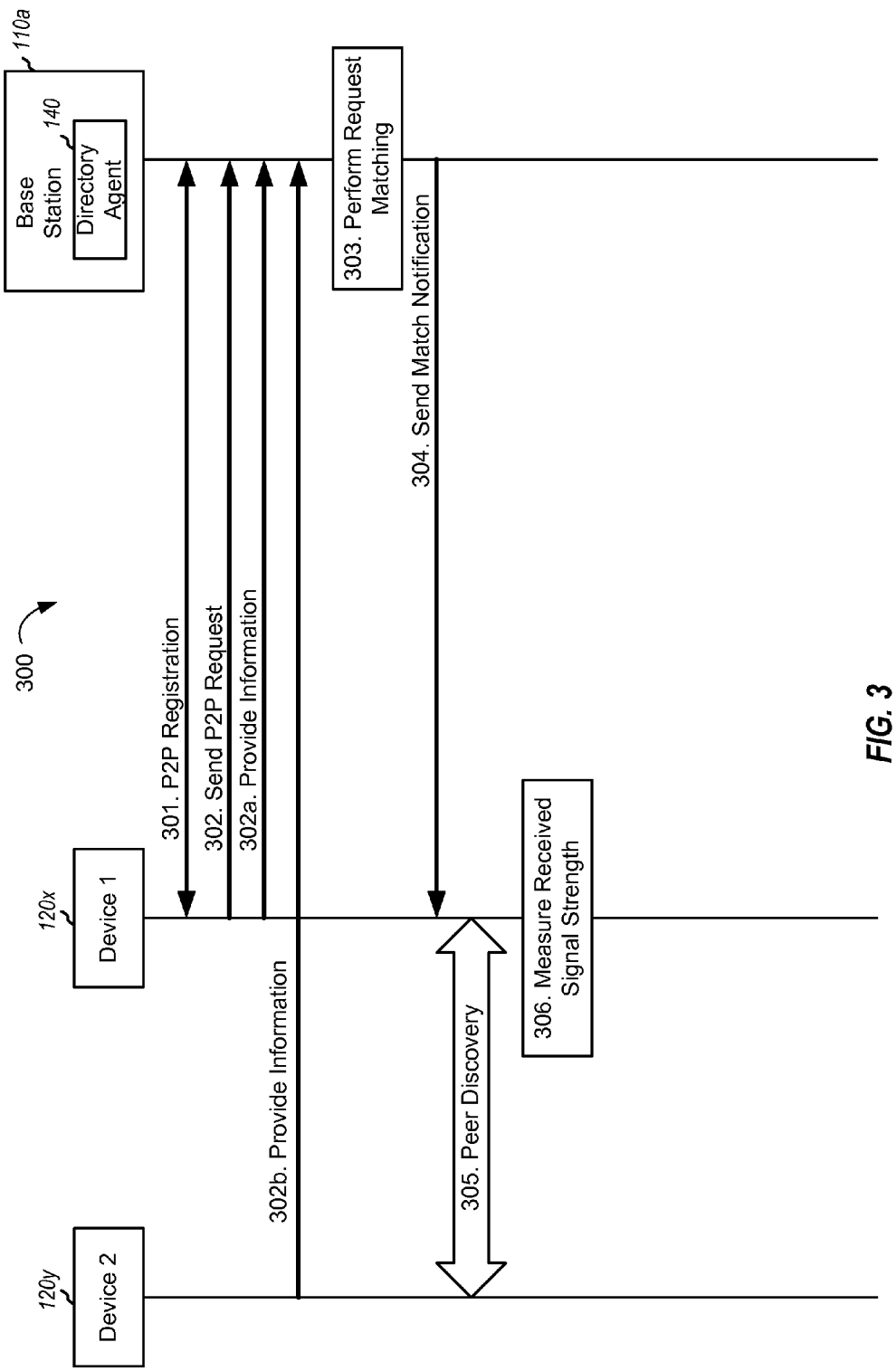
FIG. 3 shows a message flow for network-assisted peer discovery according to embodiments of the present disclosure.

FIG. 3 shows a flow diagram of a process 300 for network-assisted peer discovery. UE 120x may register itself with base station with DA 110a (or some other designated network entity) based on some trigger (step 301). For example, UE 120x may register with directory agent 140 upon entering WAN coverage, e.g., upon detecting a macro cell in wireless network 100. UE 120x may also register with directory agent 140 to request one or more services, to advertise one or more services, to query for peer devices near the vicinity of UE 120x, for example. Directory agent 140 may or may not be part of wireless communication network 100.

UE 120x may perform this P2P registration to advertise its services and/or to obtain services. Further, in one design, UE 120x may send a P2P request at the time of P2P registration (step 302). The P2P request may indicate one or more services offered by UE 120x, and/or one or more services requested by UE 120x. For example, UE 120x may run a particular P2P gaming application and may send a P2P request indicating a desire to seek partners for a particular game. A P2P request may also be for a wildcard service, which may imply that UE 120x is searching for all available services.

In one design, UE 120x may submit a new P2P request or update an existing P2P request at any time after P2P registration. An updated P2P request may be sent due to various reasons, such as a change in the operating status of UE 120x, a change in the geographical location of device 120x, a change in the battery status of UE 120x, for example. For example, a change in the battery status may preclude UE 120x from offering certain services advertised earlier and/or obtaining certain services requested earlier.

In general, a P2P request may be sent explicitly by UE 120x, or may be implicit and not sent. A P2P request may also be a transient request or a persistent request. A transient request may be valid for a predetermined period of time, which may typically be a short duration. A persistent request may be valid for an extended time period or indefinitely until it is explicitly canceled by a requesting device or removed by directory agent 140 due to some trigger. In one design, a P2P request may be associated with a time period in which the P2P request is valid and may be discarded after this time period.

Base station with DA 110a may perform P2P registration of devices, such as based on information received from devices performing step 302, 302a, and 302b, and may maintain a list of active P2P requests from these devices. Base station with DA 110a may perform request matching, examine the P2P requests from different devices, and identify devices with matching P2P requests (step 303). Matching may be performed based on various criteria, such as the services being offered, the services being requested, the capabilities of the devices, the locations of the devices, inclusion on the buddy list, etc. For example, a match may be declared between UEs 120x and 120y due to UE 120x offering a service that is requested by UE 120y, or vice versa. A match may also require that the two devices be within RF range of one another, which may be determined based on the location information provided by the devices during P2P registration.

More particularly, in an aspect, a user of UE 120x may provide (step 302a), such as to base station with DA 110a, peer discovery information including a pre-determined list of UEs (and/or of UE P2P services) of particular interest to UE 120x (i.e., a "buddy-list") for P2P communication. In particular, in such an embodiment, UE 120x may transmit its expression comprising its peer discovery signal, as well as, by way of non-limiting example, a buddy-list, a status, a location, and the like. This information may be transmitted/broadcasted not only for receipt by base station with DA 110a, but additionally for receipt by other UEs. However, in the direct peer discovery model discussed above, the distributed nature of the discovery protocol may indicate a large amount of transmitted/received signaling messages to be used for criteria searches (such as whether a device is on a buddy-list) in peer discovery. In larger mobile networks, these large data quantities for P2P signaling messages cause UE 120x to expend its battery life, bandwidth, and computing power on processing large quantities of unnecessary and/or not-of-interest peer signaling message traffic.

However, in embodiments in which peer discovery signaling is (or is also) broadcast/transmitted for receipt by network entities, peer discovery signaling (i.e., expressions, location information) may be transmitted by UE 120x at step 302a using WAN uplink channels to server 140a associated with directory agent 140 and base station 110a. Server 140a may be, or be part of, directory agent 140 and/or base station 110a, and thus, as referenced above, may be collectively referred to herein with those elements as base station with DA 110a. Base station with DA 110a (and hence server 140a) may be of any server type known to those skilled in the pertinent arts. Because base station with DA 110a knows the buddy-list of each UE, the server 140a may match the received expressions of a given UE 120x with the expressions received from the set of all uplink transmissions, and may subsequently downlink to the UE 120x only the expressions of other UEs of interest to UE 120x, and/or an indication or alert of such expressions. Advantageously, with such a network-assisted peer discovery, the UE 120x need not listen to peer discovery signals coming from all proximate UEs, many of which are not of interest to the user of UE 120x. Accordingly, the standby time of UE 120x may be increased and, consequently, its battery life conserved.

If a match is found for the buddy list of UE 120x, then base station with DA 110a may send a notification of the match (and/or peer discovery information received from the match) to be received by UE 120x (step 304). Of course, base station with DA 110a may also notify UE 120y, which may have performed P2P registration with directory agent 140 earlier and may be part of the match for P2P communication with UE 120x. The match notifications may inform UEs 120x and 120y to initiate direct peer discovery, for example, or to begin P2P communication.

UE 120x (and UE 120y in the foregoing example) may thus perform direct peer discovery in response to receiving the match notifications from base station with DA 110a (step 305). Direct peer discovery may be performed to determine whether two or more matched devices are in sufficient RF proximity in order to establish a direct data connection without involving a wireless network (step 306). Of course, this proximity information may alternatively be included in, or impliedly be indicated as acceptable based on, the communication received by UE 120x from base station with DA 110a at step 304. Those skilled in the pertinent arts will appreciate that detection of RF proximity may be useful for other purposes even if P2P communication is not desired.

Figure 4:
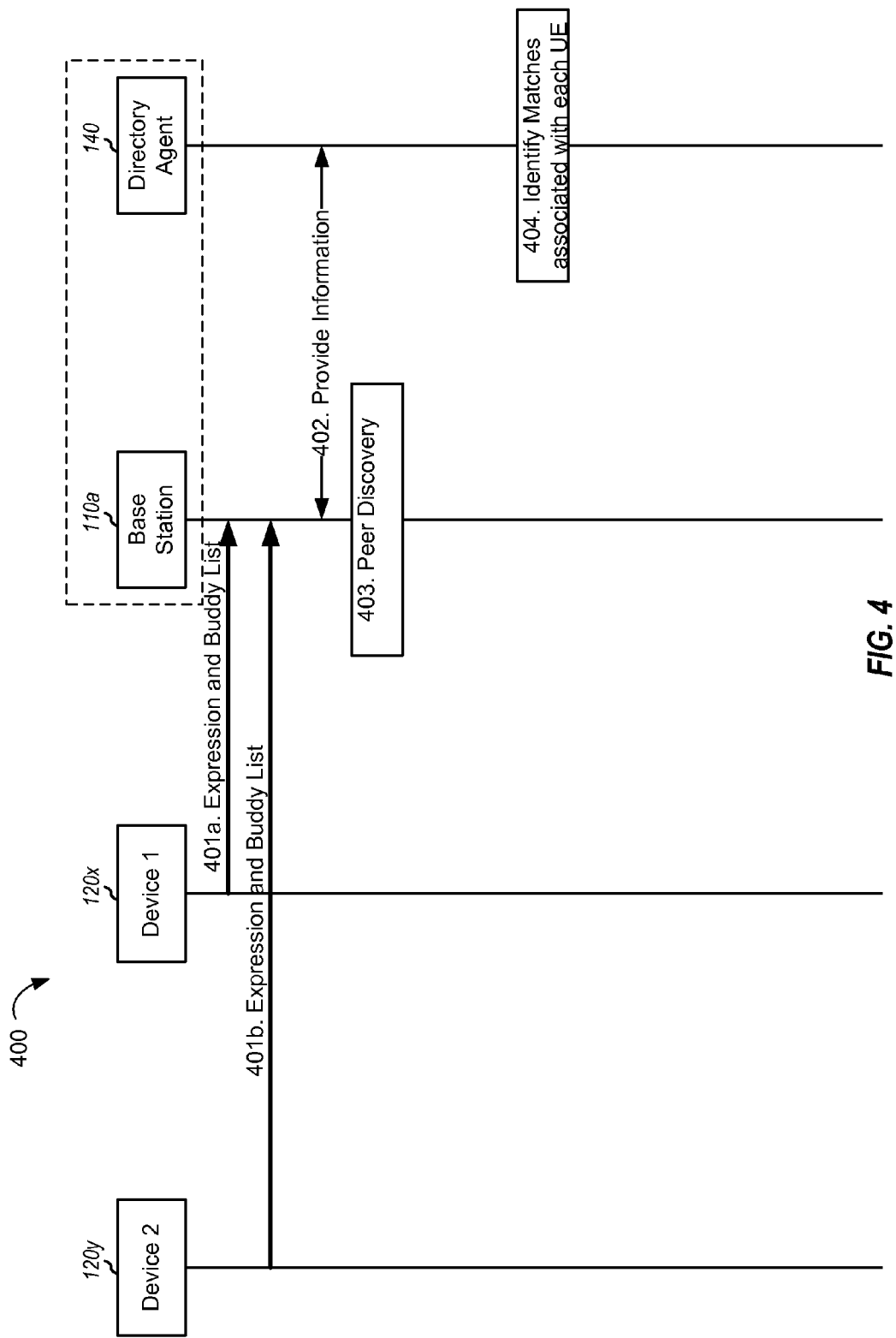
FIG. 4 shows a process for performing network-assisted peer discovery according to embodiments of the present disclosure.

FIG. 4 illustrates with particularity exemplary steps performed by a network entity (or entities) in a network-assisted peer discovery technique 400. In this design, base station with DA 110a may receive an expression and a buddy list from at least one UE 120x, and peer discovery information (such as an expression) from at least two UEs 120x, 120y (steps 401a and 401b). Directory agent 140 may notify, or may provide information to allow for notification to, serving base station with DA 110a regarding the match between UEs 120x and 120y, to thereby enable base station 110a to assist these devices in performing peer discovery (step 403). Base station 110a may assist (step 402) by determining one or more parameters for the peer discovery, such as: (i) which particular pilot sequence to use for a PDS; (ii) which device should transmit the PDS and which device should receive the signal; (iii) time and frequency resources to use to transmit the PDS; (iv) transmit power level of the PDS; and/or (v) other parameters. These parameters may be selected by considering the long-term channel quality of UEs 120x and 120y, so that lower interference can be observed in detection of the PDS, which may increase discovery range.

For example, at step 403, serving base station 110a (or some other designated network entity) may select P2P communication or WAN communication for UEs 120x and 120y. P2P communication may be directed if the signal strength of the PDS measured by UE 120x or 120y, which may be received in the uplink for network-assisted peer discovery by base station 110a at step 401, indicates that the quality of the wireless channel between UEs 120x and 120y is sufficiently good, e.g., if the received signal strength exceeds a threshold. Conversely, WAN communication may be directed for UEs 120x and 120y if the received signal strength is insufficient, e.g., below the threshold. In one design, even if P2P communication is selected, a WAN connection may be directed at step 403 for UEs 120x and 120y as a backup.

In another design, UE 120x may first perform direct peer discovery to detect other devices in its vicinity. UE 120x may then report the received signal strength, and, for example, a device ID and/or a service ID of each detected device, along with a P2P request, to base station with DA 110a. The device ID and/or service ID of each detected device may be obtained from a PDS transmitted by that device. The expressions (i.e., the IDs) and signal strength of each detected device may be used by directory agent 140 to identify the matches (i.e., buddy-list matches) associated with each device at step 404.

Figure 5:
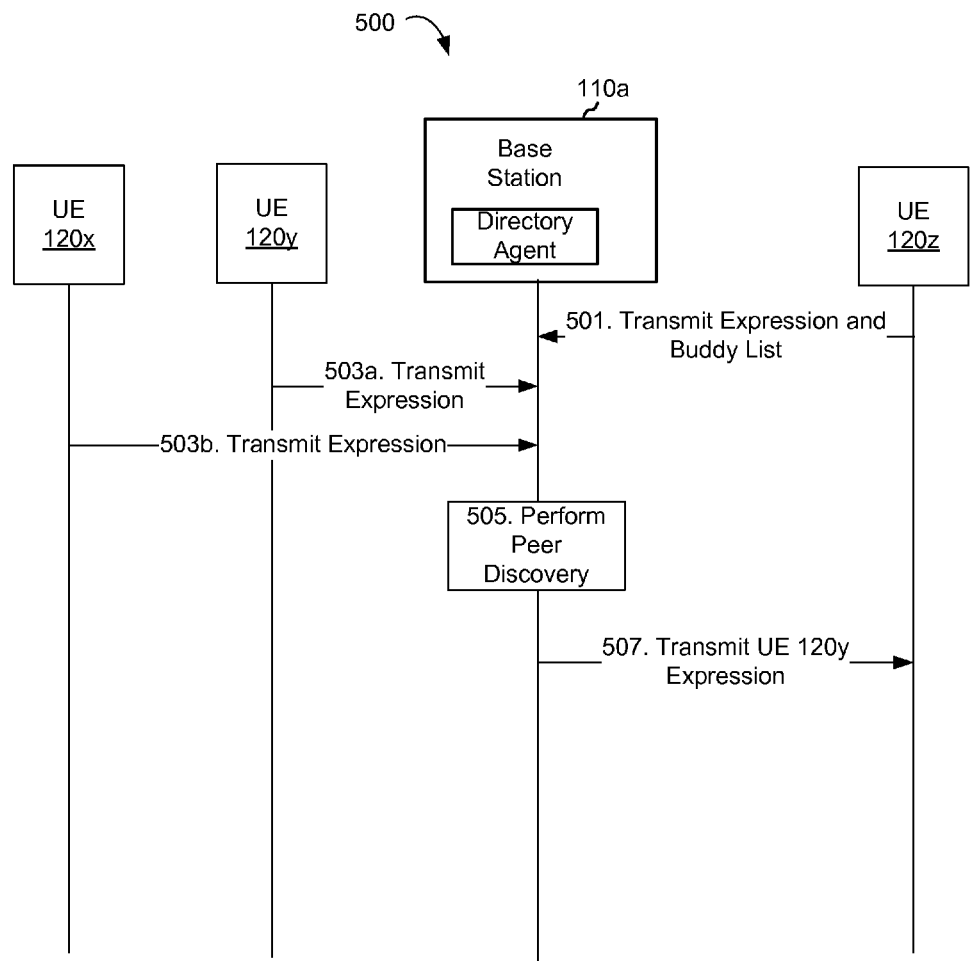
FIG. 5 shows a process for supporting network-assisted peer discovery according to embodiments of the present disclosure.

FIG. 5 illustrates with greater particularity an exemplary network-assisted peer discovery technique 500. For purposes of simplicity, three UEs, UEs 120x, 120y, and 120z, and one base station with DA 110a, are shown. In this example, the peer discovery performed is with respect to UEs in the vicinity of UE 120z, however, the peer discovery performed by the base station 110a may be with respect to UEs in the vicinity of all other UEs (e.g., UE 120x, 120y, 120z).

UE 120z may transmit its expression in its PDS, and may further transmit its buddy list, status, location, and the like, for reception by base station with DA 110a (step 501). At step 503a and 503b, the base station 110a may receive IDs (and peer discovery information) transmitted from other UEs (UEs 120x and 120y, in this example). At step 505, the base station 110a may perform network-assisted peer discovery. In particular, the base station 110a may analyze the IDs and peer discovery information of UEs 120x and 120y to determine if these UEs 120x and 120y are of interest to, and/or are in the vicinity of, UE 120z. As such, peer discovery matching, such as from a buddy list, may be done with the constraint that the UEs matched are in the vicinity of one another. The "vicinity" may be determined from the location information transmitted in the uplink channel, or by other known techniques.

The "vicinity of" UE 120z may be defined by UE 120z, such as by forming part of a buddy list submission to base station with DA 110a. For example, the vicinity may refer to UEs located within a particular distance from UE 120z (e.g. 10 miles, 20 miles, and the like), within the same city in which UE 120z is currently located, within the same state, or the like. Based on this defined vicinity (which may be included in UE 120z's transmitted peer discovery information, as referenced herein), the base station 110a may filter through received peer discovery information (which may include the location information of other UEs 120x, 120y), to determine if other UEs are in the defined vicinity of UE 120z (and/or if UE 120x and/or 120y are on UE 120z's buddy list of UEs of interest to UE 120z).

In this example, base station 110a may determine that both UEs 120x and 120y are in the defined vicinity of UE 120z, but only UE 120y is on UE 120z's buddy list. As such, at step 507, base station 110a may transmit UE 120y's peer discovery information to UE 120z, thus alerting UE 120z of UE 120y's presence nearby, and/or may direct that UEs 120y and 120z interact for direct peer discovery. Therefore, UE 120z need not listen to all peer discovery information for all UEs, many of which UE 120z is not interested in communicating with (e.g., UE 120x in the foregoing example).

The communication discussed herein between a UE and a base station may be referred to as an "Ud" interface. For example, the transmitting and receiving of information, as performed, for example, in steps 501, 503a, 503b, and 507 (described in connection with FIG. 5), may be performed via the Uu interface. The Uu interface may include: (i) a protocol stack for a user-plane carrying traffic data; and (ii) a protocol stack for a control-plane carrying signaling. The user-plane protocol stack for the Uu interface may include Packet Data Convergence Protocol (PDCP), Radio Link Control (RLC), Medium Access Control (MAC), and physical layer (PHY). The control-plane protocol stack for the Uu interface may include Radio Resource Control (RRC), PDCP, RLC, MAC, and PHY. RRC, PDCP, RLC, and MAC in LTE are described in documents 3GPP TS 36.331, TS 36.323, TS 36.322, and TS 36.321, respectively, which are publicly available and incorporated herein by reference.

Although network-assisted peer discovery may conserve the resources of a UE for the reasons discussed herein, significant inefficiencies may nevertheless be introduced through the use of the Uu interface. This may particularly occur when information is transmitted using Transmission Control Protocol/Internet Protocol (TCP/IP), as is typically the case in currently available network-assisted peer discovery embodiments. TCP/IP is a communication protocol developed to inter-network dissimilar systems. For example, TCP/IP is the protocol to interconnect, and to ensure delivery of data as between, the disparate nodes and systems of the Internet; and TCP/IP is correspondingly the currently accepted standard for WANs, such as WAN 100. As such, IP is typically employed in the network layer, and TCP is typically employed in the Transport Layer of the Open Systems Interconnection (OSI) model, in which Transport Layer data delivery is ensured. The OSI further includes the Physical Layer (PHY) (which concerns electrical signaling and physical interconnection), the Data Link Layer (with Logical Link Control and the aforementioned MAC as sublayers, which governs point to point transmission) including the Network Control Channels, such as the Paging Channel (PCH), the Access (AGCH) and Random Access (RACH) Channels, the Broadcast Channel (BRCH), and the Synchronization Channel (SCH), among others), the Network Layer (which routes data based on WAN addressing, and which, of note), the aforementioned Transport Layer, the Session Layer (which governs, i.e., starts and stops, communication sessions), the Presentation Layer (which governs decryption and data conversion), and the Application Layer (which governs specific application-based data exchange).

TCP/IP typically requires additional time, resources, and overhead when compared to other data transport methods, particularly in order to serve its typical function in the Transport and Network Layers of ensuring that data arrives intact and complete, thereby insuring that the data may be normalized across the aforementioned dissimilar entities and/or across varying applications at the Application Layer. For example, TCP may require a traffic data link to be set-up by the base station on the MAC/PHY Layer. Further, TCP may use "flow control," wherein a determination is made when data needs to be re-sent, and to stop the flow of data until previous packets sent are successfully transferred (such flow control constitutes collision avoidance). When flow is stopped, the data packet is re-requested until the whole packet is complete, and the received packet is identical to the original. TCP also performs the service of error-correction, and further requires that all packets are received prior to reassembly at the recipient. Due to the foregoing, TCP/IP is often an inefficient means of communication in applications in which the data transmitted is simple and brief, i.e., in application in which the data need not be confirmed as intact, complete, and normalizable.

Figure 6A:
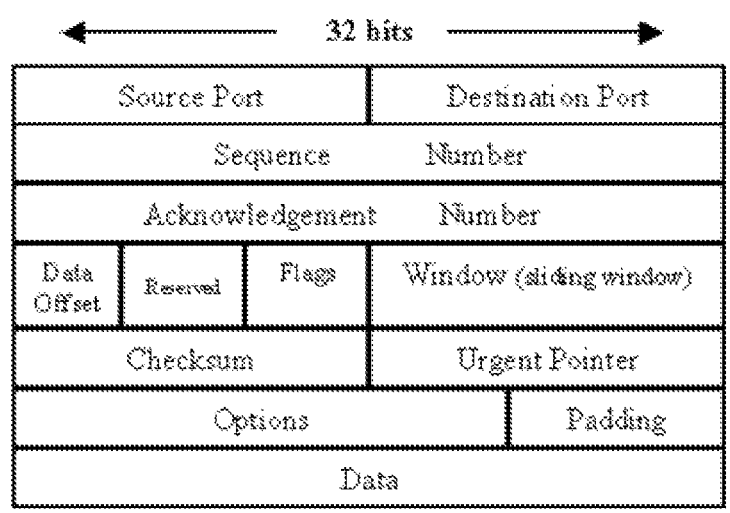
FIGS. 6A and 6B illustrate TCP and UDP segment formats, respectively, according to embodiments of the present disclosure.
Figure 6B:
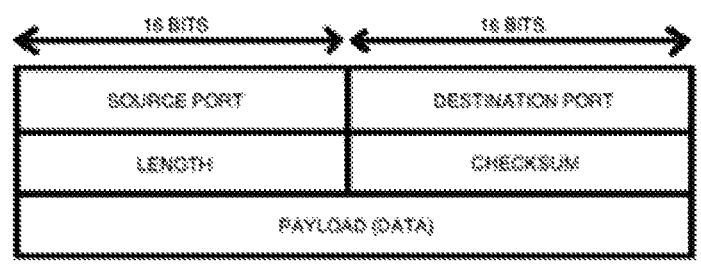

An aspect of TCP, User Datagram Protocol (UDP), does not include the additional constraints typical of TCP communications. The TCP and UDP segment formats, which illustrate the relative complexity of each protocol, are illustrated respectively in FIGS. 6A and 6B. In short, UDP simply transmits packets, typically in embodiments in which there is not a need or sufficient time to retransmit erroneous or dropped packets. Unlike TCP, UDP does not provide flow control, or require an established connection between recipients prior to transmitting data. Moreover, UDP assumes that error checking and correction are either not necessary or are performed at the Application Layer. UDP's stateless nature is thus useful for small data transmissions, and can provide much faster processing times for these small data transmissions. Further, due to the simplistic nature of UDP, it is often a preferred method of data exchange in the PHY and/or MAC Layer. As referenced herein, peer discovery information may be short, simple data bursts, such as on the order of 12 to 70 bits of information.

Further, in currently available designs for network-assisted peer discovery, particularly in LTE WANs 100, communication scheduling for exchange of the foregoing peer discovery information is typically fully dynamic. In an LTE subframe, dynamic scheduling is employed in the aforementioned RLC in the early portion of each subframe. For example, for the downlink, resources are always assigned when available for dynamic scheduling. And, for data sent in the uplink, the UE dynamically requests transmission opportunities whenever data arrives at the UE. Thus, information, regarding data sent in the downlink, and regarding uplink transmission opportunities, must be dynamic to account for the lack of knowledge regarding when data will arrive at the UE is thus scheduled at the beginning of each sub-frame.

However, dynamic scheduling is useful principally for infrequent and bandwidth consuming data transmissions, and is less suited for frequent, small data exchanges, i.e., small data bursts at regular intervals. More particularly, if the data rate is very low, the comparative overhead of the scheduling messages for dynamic scheduling is very high, and thus inefficiencies are introduced.

Figure 7:
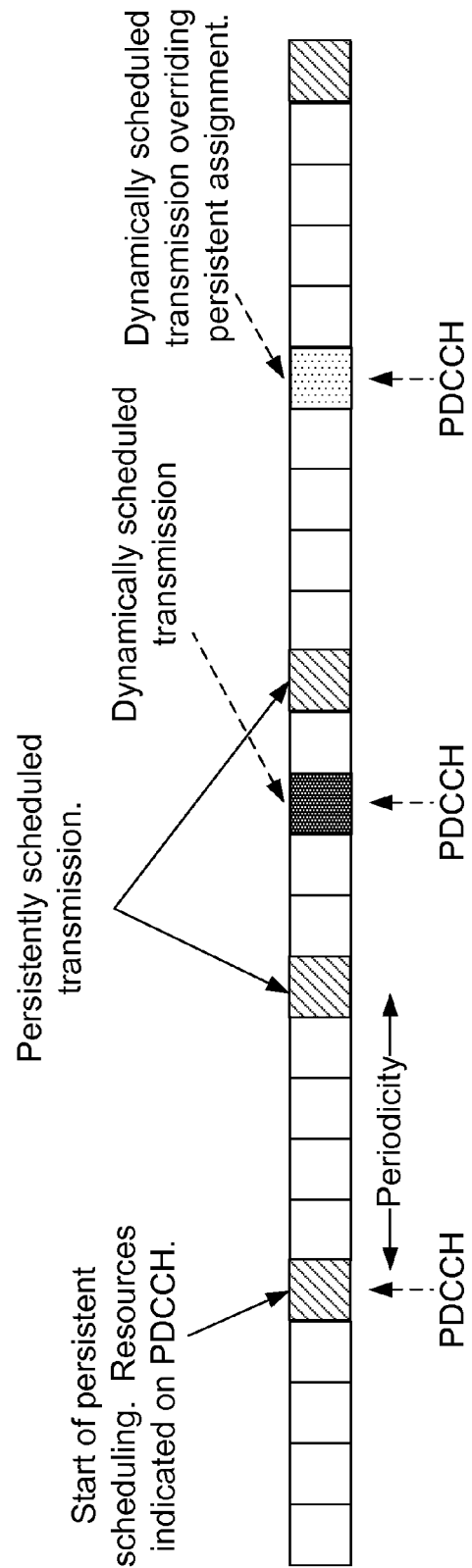
FIG. 7 shows an example of semi-persistent scheduling according to embodiments of the present disclosure.

In semi-persistent scheduling, rather than dynamically scheduling as needed for each uplink or downlink transmission, a transmission pattern is defined and made available. This significantly reduces the scheduling overhead. Moreover, the resources, i.e., the subframes and resource blocks, dedicated to the semi-persistently scheduled data may be selectively chosen so as to further minimize the impact of scheduling messages on comparative overhead. The use of semi-persistent scheduling with respect to the LTE subframe is illustrated in FIG. 7. Semi-persistent scheduling may further include a sounding reference signal (SRS). An SRS may serve to measure factors for successful communications linkage, such as channel quality, channel consistency, channel communication delays, such as propagation delays, and the like.

Within or in association with base station with DA 110a, controller/processor 190 may perform various functions to support peer discovery. Controller/processor 190 may perform specific aspects of P2P registration for devices, may receive P2P requests from devices, may perform request matching, and may provide notifications to initiate peer discovery by matched devices (all acting as, or in conjunction with, directory agent 140 and server 140a). Controller/processor 190 may also perform other processes for the network-assisted peer discovery techniques described herein. A memory 192 may store program codes and data for, from, or within directory agent 140 for use by controller/processor 190. Memory 192 may store information for devices that have registered with the directory agent, P2P requests from the devices, etc.

Figure 8B:
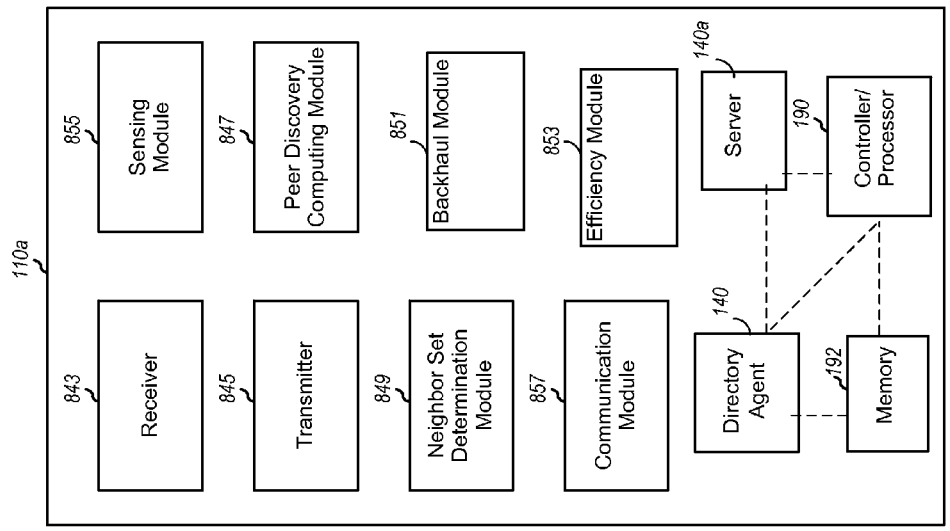
FIGS. 8A and 8B show block diagrams of a UE and a base station, respectively, according to embodiments of the present disclosure.
Figure 8A:
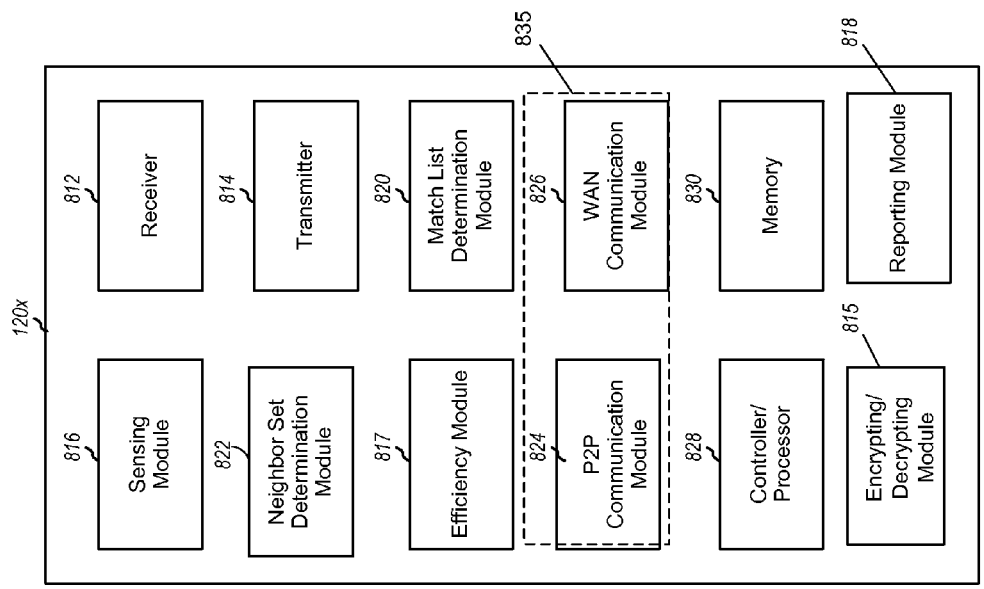

FIG. 8A shows a block diagram of a UE 120x capable of P2P communication and WAN communication according to the disclosure. Within UE 120x, a receiver 812 may receive P2P signals transmitted by other UEs for P2P communication, peer discovery signals (including the expressions, hashed expressions, and/or time varied hashed expressions discussed herein), and downlink signals transmitted by base stations for WAN communication, by way of non-limiting example. A transmitter 814 may transmit P2P signals to other UEs for P2P communication, peer discovery signals (including the expressions discussed herein), and uplink signals to base stations for WAN communication, by way of non-limiting example.

An encrypting/decrypting module 815 may encrypt or encode identifying information for UE 120x, such as an expression of UE 120x, for transmission by transmitter 814, such as to other UEs and/or associated relays 180x, for secure peer discovery. Module 815 may also decrypt or decode identifying information for other UEs, such as the expressions of other UEs received by receiver 812 (such may be received from other UEs and/or associated relays 180x for secure peer discovery). A sensing module 816 may detect the presence of other UEs, such as using decrypted peer discovery signals, may detect the presence of base stations, and may measure channel gains, received power, and the like, for the detected UEs and for base stations. In accordance with the instant disclosure, sensing module 816 may further receive and discern peer discovery information, directions, and or communications received via WAN transmission from base station with DA 110a for network-assisted peer discovery.

Efficiency module 817 may direct peer discovery data exchange with base station 110a in accordance with the herein described data exchange efficiency techniques. The data exchange efficiency techniques prescribed by efficiency module 817 may be responsive to data received by UE 120x at sensing module 816, and/or may be responsive to data received and processed by base station 110a and transmitted for ultimate reception by sensing module 816.

A match list determination module 820 may determine a match list, specifically, UEs desired for communication, such as when in sufficient proximity for communication, services desired by UE 120x, and/or UEs known to be available to communicate (such as per sensing module 816). Match list determination module 820 may include a listing module, from which UE 120x may indicate a list of UEs. A neighbor set determination module 822 may determine a neighbor set of UE 120x (if applicable) based on the active set of the UE 120x, the active sets of other UEs communicating with UE 120x, and/or UEs known to a communicative (with the UE 120x) base station 110a. A reporting module 818 may send information indicative of the active set, neighbor set, peer signals and signal strengths, and channel gains, for example, to a corresponded base station 110a and/or to other UEs.

A P2P communication module 824 may support P2P communication, e.g., may generate and process signals used for P2P communication, such as responsively to sensing module 816. A WAN communication module 826 may support WAN communication, for example, may generate and process signals used for WAN communication. P2P communication module 824 and WAN communication module 826 may be referred to collectively as communications module 835. The various modules within UE 120x may operate as described hereinthroughout. A controller/processor 828 may direct the operation of various modules within UE 120x. A memory 830 may store data and program codes for UE 120x.

FIG. 8B shows a block diagram of a base station with DA 110a supporting WAN communication, and at least peer discovery for P2P communication. Within base station with DA 110a, a receiver 843 may receive uplink signals transmitted by UEs to base stations 110a. A transmitter 845 may transmit downlink signals to UEs.

A peer discovery computing module 847 may compute information, such as peer discovery information, for transmission by transmitter 845. Further, the peer discovery expression computing module 847 may compute data based on peer discovery information (such as the rates of change of peer discovery information), to enable performance of the network-assisted peer discovery techniques herein described. A neighbor set determination module 849 may determine a neighbor set, such as, for example, based on the active sets of UEs communicating with base station 110a, and based on adjacent or related base stations and relays. Neighbor set determination module 849 may further maintain match listings received of, and query the peer discovery computing module 847 for the presence of, expressions of UEs with which other UEs particularly wish to communicate. Directory agent 140 may receive such match listings, may compare to received expressions, and may alert various other modules, including efficiency module 853, in the event of a match.

In the event of a match, efficiency module 853 may engage in peer discovery data exchange with matched UEs in accordance with the herein described data exchange efficiency techniques. The data exchange efficiency techniques prescribed by efficiency module 853 may be responsive to UE-related data received by base station 110a, and or to data calculated by peer discovery computing module 847. Efficiency module 853 may direct efficient peer discovery data exchange, such as via unicast or broadcast transmission over receiver 843.

Base station with DA 110a may employ backhaul module 851 to communicate with other network entities, such as other relays and/or base stations. Sensing module 855 may detect the presence of UEs, and may measure channel gains, received power, and the like, for example, of the detected UEs. A communication module 857 may support uplink and downlink communication for UEs and may, for example, generate and process signals used for WAN communication. The various modules within base station 110a may operate as described herein. A controller/processor 190 may direct the operation of various modules within base station 110a. Controller/processor 190 may be, form part of, or be distinct from the processing provided by server 140a. A memory 192 may store data and program codes for relay 180.

Figure 9A:
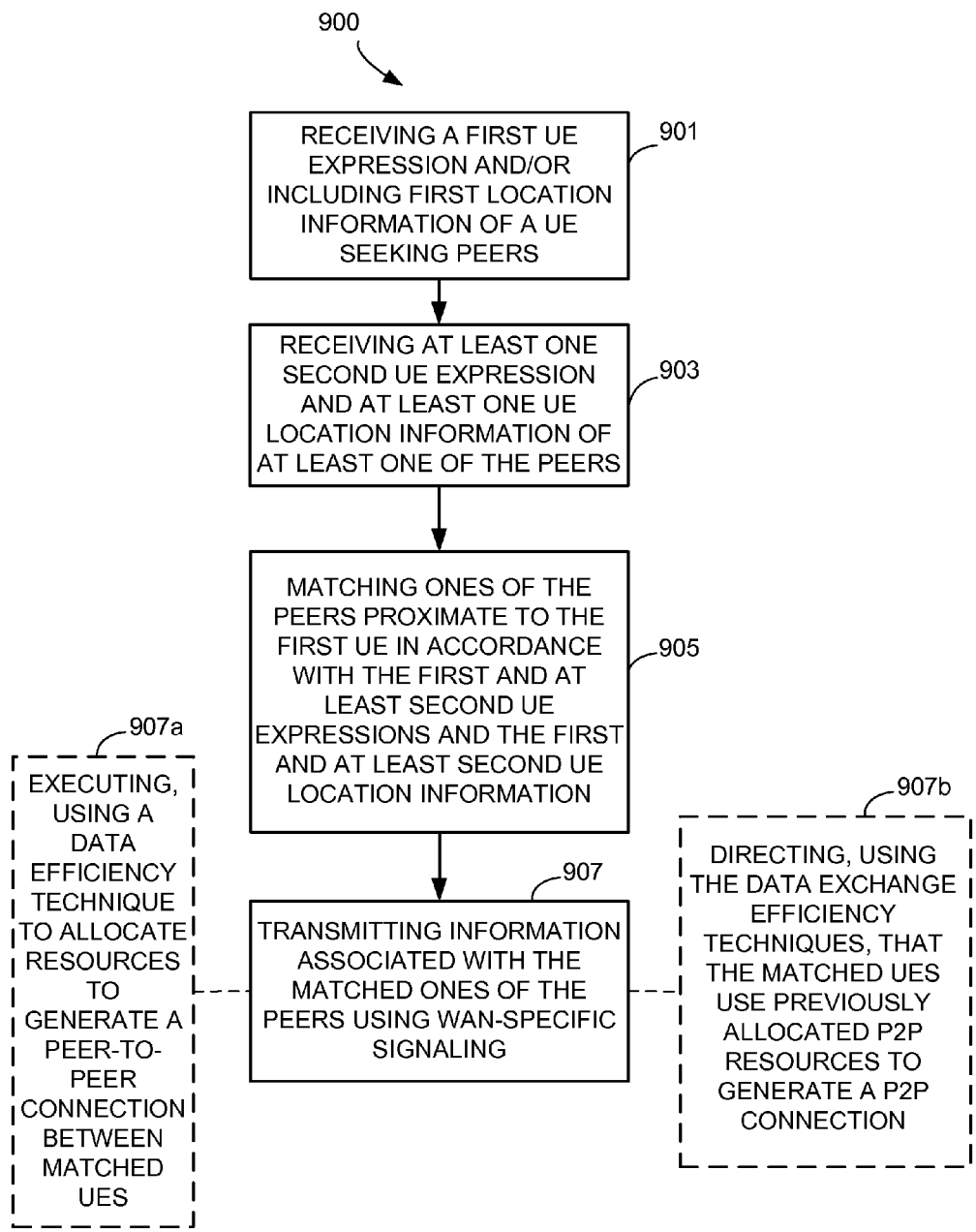
FIGS. 9A-9D show a methodology, operable by a network entity, such as a base station, for performing network assisted peer discovery according to embodiments of the present disclosure.

In accordance with one or more embodiments described herein, and with reference to FIG. 9A, there is shown a methodology 900, operable by a network entity such as a base station with DA 110a having associated therewith a directory agent 140, server 140a, and controller/processor 190 (e.g., an eNodeB). It is noted that numbers associated with the blocks of FIG. 9 do not imply a particular order in which the corresponding steps are to be performed according to the method 900. Specifically, FIG. 9A describes an exemplary method 900 of achieving additional data exchange efficiencies through the use of network-assisted peer discovery.

In FIG. 9A, at step 901, base station 110x may receive a first UE expression and (or including) first UE location information of a first UE 120x seeking peers. The first UE expression may include a pre-determined list of other UEs that may be of interest to the first UE, referred to above as a "buddy list" for the first UE. At step 903, the base station 110x may receive at least one second UE expression and at least one second UE location information of at least one of the peers, such as UE 120y.

Based on the first and at least second UE expressions, and the first and at least second UE location information, the buddy list of the first UE 120x, and/or other information, such as data change rates for peer discovery data of UE 120x and/or 120y, at step 905 the base station 110x may match ones of the peers (UE 120y) proximate to the first UE seeking peers (UE 120x). Likewise, in a bilateral embodiment, upon finding a match the base station 110x may check if the match is bilateral, i.e., if UE 120x is also on the buddy list for UE 120y. At step 907, the eNodeB may transmit information associated with the matched ones of the peers to the matched ones of the peers using WAN-specific signaling (i.e., the effecting of a data exchange efficiency technique), such as to cause a peer-to-peer connection to occur, in accordance with the herein described techniques to improve data exchange efficiency. For example, at step 907a, base station 110a may use the herein disclosed data exchange efficiency techniques to execute an allocation of resources to generate a P2P connection between the matched UEs (UE 120x and 120y). Alternatively, base station 110a may direct, using the herein disclosed data exchange efficiency techniques at step 907b, that the matched UEs use previously allocated P2P resources to generate a P2P connection. In yet a further alternative, base station 110a may indicate, using the herein disclosed data exchange efficiency techniques at step 907b, of a match between UEs, whereafter the matched UEs may use P2P resources to generate a P2P connection.

By way of non-limiting example of data exchange efficiency techniques, step 907 may include use of WAN signaling in the form of the aforementioned UDP protocol, rather than the typical current use of the TCP/IP protocol, in the peer discovery communication between base station with DA 110a and UEs 120x and 120y. Further, step 907 may indicate the use of a more efficient data exchange technique, such as UDP, in an OSI layer atypical of current use, such as in the Transport, PHY, or MAC layer. Moreover, step 907 may employ the improved data exchange efficiency technique of using semi-persistent scheduling (with or without the use of an error check sum, such as the SRS referenced above), rather than the typically employed dynamic scheduling, for peer discovery communications between base station 110a and UEs 120x and 120y. Yet further, step 907 may be performed using a paging channel, i.e., a LTE non-traffic channel, rather than the typically used traffic/broadcast channel. Those skilled in the art will appreciate, in light of the disclosure herein, that known interactions between base station 110x and UEs 120x and 120y may likewise dictate that step 901 is also performed using one or more of the foregoing improved data exchange efficiency techniques, as is discussed further hereinthroughout. One of ordinary skill in the art would understand, in light of the instant disclosure, that the data exchange efficiency techniques discussed may be employed in any combination of protocol types, communication layers, scheduling techniques, and communication channels referenced herein.

By way of example, the base station with DA 110a may employ the use of a data exchange efficiency technique based on different rates of change of the expression and/or location information of the matched peers at step 905. Accordingly, the base station may determine a rate of change of the first UE expression and/or the first UE location information. For example, the first UE expression may preferably include an encryption, such as using known encryption techniques, and the rate of change of a public-key encryption function may dictate that a particular data exchange efficiency technique(s) be employed to insure sufficient timeliness of the matching of expressions, and/or timeliness of the instruction to seek or to open P2P communications by base station 110a at step 907. Likewise, UE 120y may be moving at such a rate that, in view of its propagation delay, its rate of change indicates a particular type of data exchange efficiency technique to base station 110a. That is, different data exchange efficiency techniques may be more advantageous (e.g., such as by providing reduced energy consumption or greater likelihood of connectivity) for different rates of change of the respective expressions and location information of a respective UE, or of the matched ones of the respective UE. For example, use of the paging channel may be more attractive when the rate of change of expression(s) is relatively low, e.g., when the UE's location or encryption is relatively static. On the other hand, use of the semi-persistent downlink scheduling may be more appropriate when the UE and at least one second UE expressions change more frequently. Such determinations may be made by processor/controller 190 of base station 110x, acting in concert with directory agent 140 (and the P2P/expression information contained therein), for example. Of course, directory agent 140 may include an aspect, such as an indicator table, for indicating, such as to controller/processor 190, advantageous data exchange efficiency techniques in a variety of communication circumstances. Similarly, the base station 110a may set a threshold rate of change of the first UE expression and/or location information. Thereby, based on whether the rate of change is greater or less than the threshold, the data exchange efficiency technique may be selected.

Figure 9B:
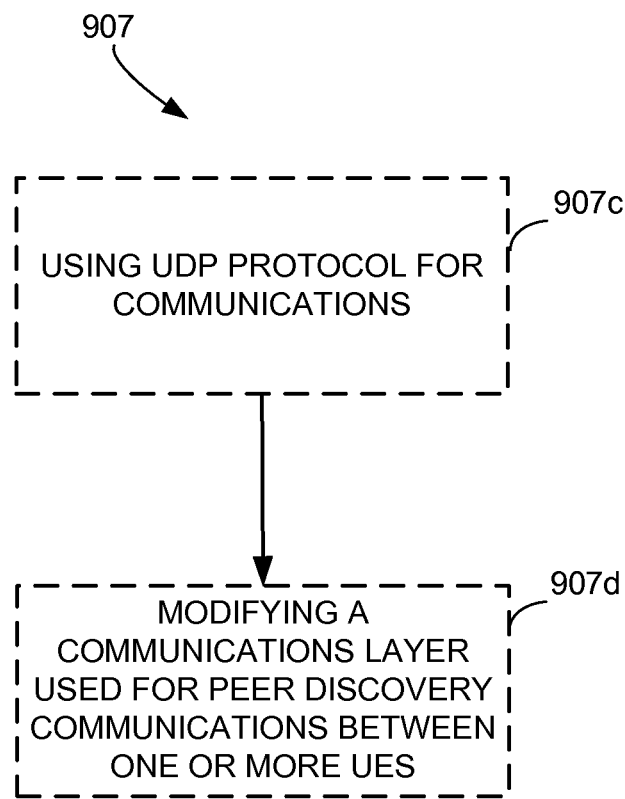

In a specific illustration of a data exchange efficiency technique, illustrated with respect to FIG. 9B, step 907 may include use of the UDP protocol for WAN signaling, rather than the TCP/IP protocol, for transmissions from base station 110a to UEs 120x and 120y at step 907c. This protocol change at step 907 may be directed by base station with DA 110a, and may be directed based on measurements of the strength of the communication link with one or more UEs served by base station 110a, by the overhead for communications with one or more of the UEs and/or across multiple UEs served by, by the strength or quality of prospective P2P links between UEs, and/or by other information held by directory agent 140 communicatively associated with base station with DA 110a.

At step 907d, base station 110a may modify the communications layer used for peer discovery communications between one or more UEs 120x and 120y and base station 110a. For example, to the extent currently available embodiments use third party applications in the peer discovery process, such current embodiments employ the Application Layer (discussed herein) for peer discovery communications between a UE and a base station. The TCP protocol is used by the Application layer for these and other communications. In contrast, the present disclosure allows for the use of, by way of non-limiting examples, more efficient data exchange communications layers (which may be enabled for use by the use of WAN signaling in the form of the UDP protocol), such as the Transport, PHY, or MAC communications layers.

Figure 9C:
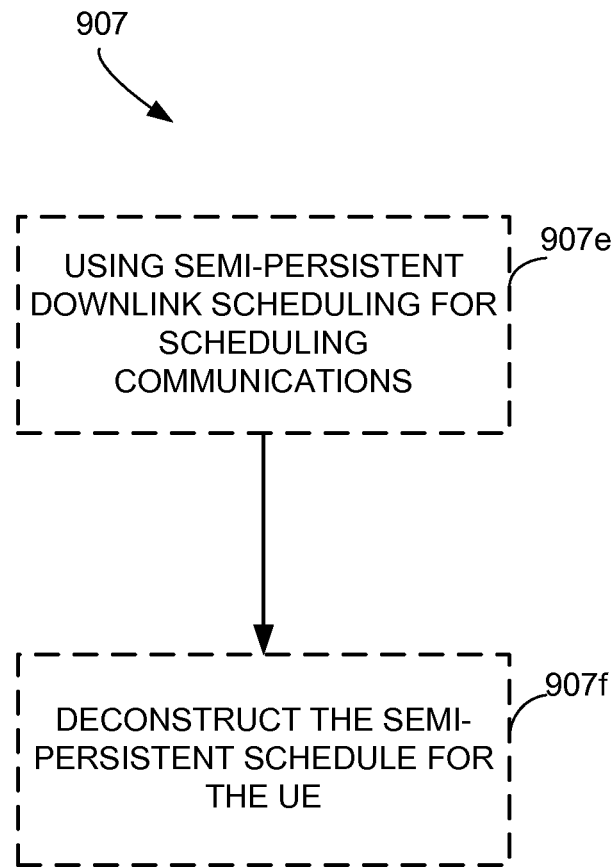

In another specific illustration of a data exchange efficiency technique, illustrated with respect to FIG. 9C, step 907 may include use of semi-persistent scheduling (e.g., the semi-persistent scheduling of downlink resources described in the LTE standard), rather than the dynamic scheduling discussed herein, for scheduling of communications, at step 907e. This scheduling change at step 907 may be directed by base station 110a, and may be directed based on measurements of the strength of the communication link with one or more UEs served by base station 110a, by the overhead for communications with one or more of the UEs and/or across multiple UEs served by, and/or by other information held by directory agent 140 communicatively associated with base station with DA 110a. Semi-persistent scheduling may be highly appropriate in circumstances in which the matched expressions change more frequently.

By way of non-limiting example using semi-persistent downlink scheduling, base station 110a may assign UE 120x a resource block(s) in which UE 120x may transmit its peer discovery expression. In an embodiment, once this scheduling directive is made, it may not be modified, or may not be modified during a particular session. Accordingly, the attendant overhead for set up of a full traffic data link is avoided. In such embodiments, further efficiencies, such as additional power savings, may be obtained in embodiments in which the UE abstains, and/or is directed to abstain by base station with DA 110a, from transmission for several consecutive opportunities (which consequently increases stand-by time). Base station 110a may further, such as at step 907f, deconstruct the semi-persistent schedule for UE 120x if that UE abstains from utilizing a predetermined number of transmission opportunities.

Figure 9D:
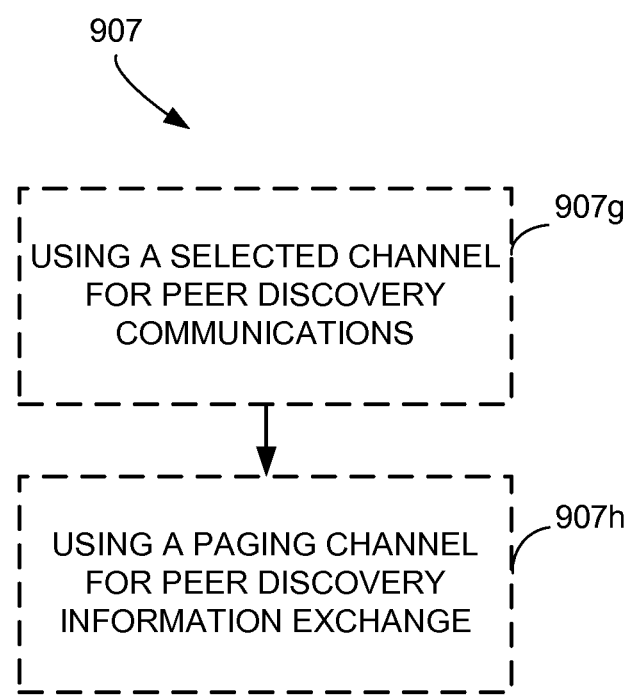

In another specific illustration of a data exchange efficiency technique, illustrated with respect to FIG. 9D, step 907 may include use of a selected channel for peer discovery communications at step 907g. This channel selection at step 907 may be directed by base station with DA 110a, and may be directed based on measurements of the strength of the communication link with one or more UEs served by base station 110a, by the overhead for communications with one or more of the UEs and/or across multiple UEs served by, and/or by other information held by directory agent 140 communicatively associated with base station 110a.

For example, at step 907h, the base station 110a may indicate the use of the aforementioned Paging Channel (PCH) (e.g., the LTE paging channel defined by the LTE standard) for peer discovery information exchange, (and more particularly, for the transmission of peer discovery information from the base station 110a to UEs 120x and 120y). In this case, matches for a buddy list may be transmitted in the same way a paging signal is transmitted on the PCH while the UE 120x is in its idle state. Use of the PCH may be most indicated when the rate of change of the match(es) (i.e., the transmitted match list may be the aggregation of all expressions found that the UE may be interested in) is relatively low, e.g., when the buddy list UEs are relatively static.

However, the PCH is necessarily unicast in nature, at least in that each UE has a dedicated set of resource blocks to which it listens at appropriate times. On the contrary, if the aforementioned Broadcast Channel (BRCH) is used, all the UEs are awakened to listen to the BRCH at the same time. Accordingly, the BRCH may also be efficiently used by the base station 110a at step 907h to assist in peer discovery.

For example, the match information may be transmitted by the base station 110a on the BRCH as coded/encrypted information broadcast for receipt by all UEs in the cell correspondent to the base station 110a. Thereby, all UEs in the cell will receive, and may decode, the match information, but each UE may be uniquely enabled to decrypt only its own unique matches from the received global match list.

Figure 10A:
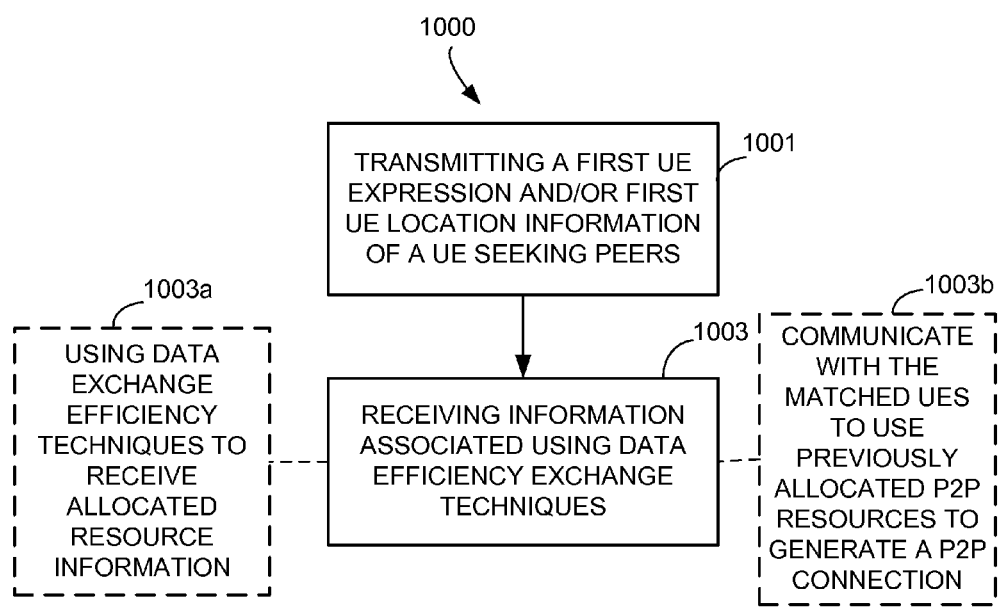
FIGS. 10A-10D show a methodology, operable by a network entity, such as a UE, for performing network assisted peer discovery according to embodiments of the present disclosure.

In accordance with one or more embodiments described herein, and with reference to FIG. 10A, there is shown a methodology 1000 operable by a network entity, such as a UE 120x. It is noted that numbers associated with the blocks of FIG. 10 do not imply a particular order in which the corresponding steps are to be performed according to the method 1000. Specifically, FIG. 10A describes an exemplary method 1000 of achieving additional data exchange efficiencies through the use of network-assisted peer discovery.

In FIG. 10A, at step 1001, UE 120x may transmit a first UE expression and (or including) first UE location information of the UE 120x seeking peers, to a base station 110a. UE 120x may transmit the expression and the location information to base station 110a using the herein described techniques to improve data exchange efficiency. The first UE expression may include a pre-determined match list of other UEs that may be of interest to the first UE, referred to above as a "buddy list" for the first UE. Those skilled in the art will appreciate that, although not reflected in FIG. 10, in addition to the first UE expressions and/or the first UE location information of the UE 120x, the base station 110a may also receive at least one second UE expression and at least one second UE location information of at least one of the peers, such as UE 120y.

Based on the first and at least second UE expressions, and the first and at least second UE location information, the buddy list of the first UE 120x, and/or other information, such as data change rates for peer discovery data of UE 120x and/or 120y, the base station 110a may match ones of the peers (UE 120y) proximate to the first UE seeking peers (UE 120x), and may transmit correspondent peer discovery information for reception by UE 120x. Likewise, in a bilateral embodiment, upon finding a match the base station 110a may check if the match is bilateral, i.e., if UE 120x is also on the buddy list for UE 120y, and may transmit accordingly. Thus, at step 1003, the UE may receive peer discovery information, such as via WAN-specific signaling (i.e., signaling over WAN that effects a data exchange efficiency technique), which may be associated with the matched ones of the peers, such as to cause or request a P2P connection to occur, in accordance with the herein described techniques to improve data exchange efficiency. The reception of information using data efficiency exchange techniques at step 1003 may be directed/requested by UE 120x, or by base station 110a. For example, at step 1003a, UE 120x may use the herein disclosed data exchange efficiency techniques to receive allocated resource information to generate a P2P connection between the UE 120x and any matched UEs (120y). Alternatively, UE 120x may communicate, responsively to the herein disclosed data exchange efficiency techniques at step 1003b, with the matched UEs (UE 120y) to use previously allocated P2P resources to generate a P2P connection.

By way of non-limiting example of data exchange efficiency techniques, step 1003 may include use of the aforementioned UDP protocol, rather than the typical current use of the TCP/IP protocol, in the peer discovery communication between base station 110a and UE 120x. Further, step 1003 may indicate the use of a more efficient data exchange technique, such as UDP, in an OSI layer atypical of current use, such as in the Transport, PHY, or MAC layer. Moreover, step 1003 may employ the improved data exchange efficiency technique of using semi-persistent scheduling (with or without the use of an error check sum, such as the SRS referenced above), rather than the typically employed dynamic scheduling, for peer discovery communications between base station 110a and UE 120x. Yet further, step 1003 may be performed using a different communications channel, i.e., an LTE non-traffic channel, rather than the typically used traffic/broadcast channel. Those skilled in the art will appreciate, in light of the disclosure herein, that known interactions between base station 110a and UEs 120x and 120y may likewise dictate that step 1001 is also performed using one or more of the foregoing improved data exchange efficiency techniques, as is discussed further hereinthroughout. One of ordinary skill in the art would understand, in light of the instant disclosure, that the data exchange efficiency techniques discussed may be employed in any combination of protocol types, communication layers, scheduling techniques, and communication channels referenced herein.

By way of example, the UE 120x may employ the use of a data exchange efficiency technique based on different rates of change of the expression and/or location information of the matched peers. Accordingly, the UE 120x may determine a rate of change of the UE expression of UE 120y and/or the UE 120y location information. That is, different data exchange efficiency techniques may be more advantageous (e.g., such as by providing reduced energy consumption or greater likelihood of connectivity) for different rates of change of the respective expressions and location information of a respective UE, or of the matched ones of the respective UE. Such determinations and thresholds may be received from processor/controller 190 of base station 110x, acting in concert with directory agent 140, for example, or may be generated by UE 120x. Similarly, the UE 120x may set a threshold rate of change of its first UE expression and/or location information. Thereby, based on whether the rate of change is greater or less than the threshold, the data exchange efficiency technique may be selected.

Figure 10B:
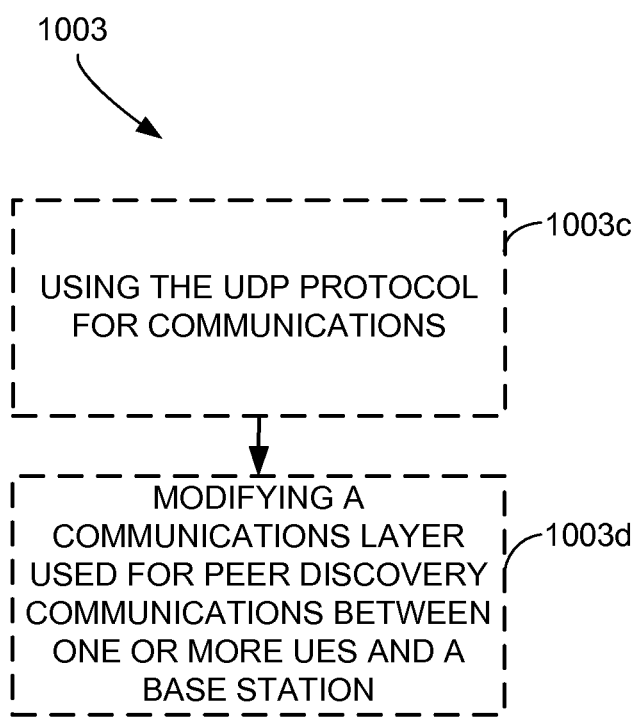

In a specific illustration of a data exchange efficiency technique, illustrated with respect to FIG. 10B, step 1003 may include use of the UDP protocol, rather than the TCP/IP protocol, for communications at step 1003c. This protocol change at step 1003 may be assessed by UE 120x, and may be directed based on measurements of the strength or quality of the communication link with the serving base station 110a, by the overhead for communications with the serving base station 110a, and/or the strength or quality of the prospective P2P link to peer UEs At step 1003d, UE 120x may modify the communications layer used for peer discovery communications between UE 120x and base station 110a. For example, to the extent current embodiments use third party applications in the peer discovery process, such current embodiments employ the Application layer (discussed herein) for peer discovery communications between a UE and a base station. The TCP protocol is used by the Application layer for these and other communications. In contrast, the present disclosure allows for the use of, by way of non-limiting example, more efficient data exchange communications layers (which may be enabled for use by the use of UDP protocol), such as the Transport, PHY, or MAC communications layers.

Figure 10C:
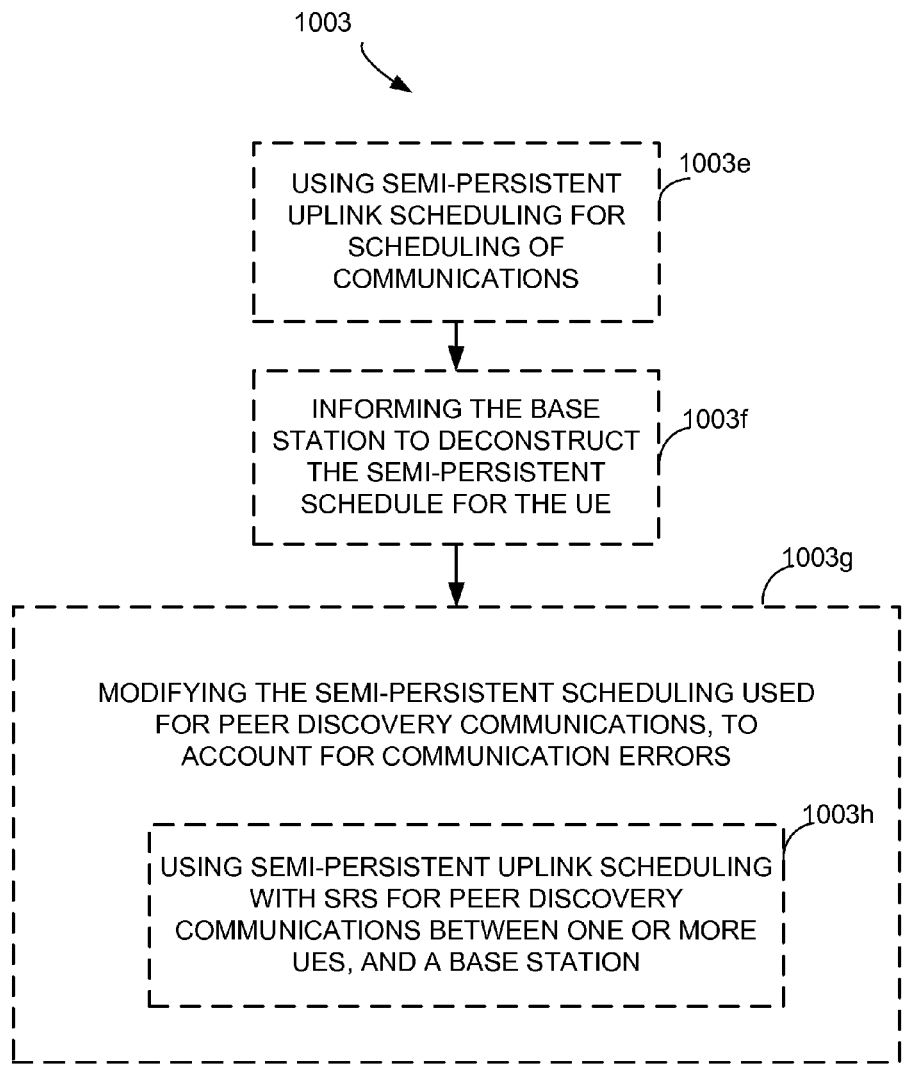

In another specific illustration of a data exchange efficiency technique, illustrated with respect to FIG. 10C, step 1003 may include use of semi-persistent uplink scheduling, rather than the dynamic scheduling discussed herein, for scheduling of communications, at step 1003e. This scheduling change at step 1003 may be assessed by UE 120x, and may be directed based on measurements of the strength or quality of the communication link with the serving base station 110a and/or with peer UEs, by the overhead for communications with the serving base station 110x, and/or communications across peer UEs. Semi-persistent uplink scheduling may be highly appropriate in circumstances in which the matched expressions change more frequently.

By way of non-limiting example using semi-persistent uplink scheduling, UE 120x may transmit its peer discovery expression in the resource blocks assigned by the base station 110a. In an embodiment, once this scheduling directive is made, it might not be modified, or might not be modified during a particular session. Accordingly, the attendant overhead for set up of a full traffic data link is avoided. In such embodiments, further efficiencies, such as additional power savings, may be obtained in embodiments in which the UE abstains, and/or is directed to abstain, from transmission for several consecutive opportunities and to consequently increase stand-by time. UE 120x may further, such as at step 1003f, inform the base station 110a to deconstruct the semi-persistent uplink schedule for UE 120x if UE 120x abstains from utilizing a predetermined number of transmission opportunities.

Further, at step 1003g, UE 120x may modify the semi-persistent uplink scheduling used for peer discovery communications between UE 120x and base station 110x, such as to account for communication errors that may occur but without need of using the TCP protocol for assurance of integrity and link consistency. For example, at step 1003h, UE 120x may transmit, to the base station 110a, an error check signal, such as an SRS (as discussed herein), from which the base station may estimate a propagation delay to the UE 120x. The base station 110a may therefrom discern that effective period (which may include abstinence from transmission) of the semi-persistent schedule is too long to ensure that the UE 120x's uplink transmission arrives at the required time at the base-station 110a to allow the base station to effect P2P discovery or a P2P link. By way of non-limiting example, if UE 120x is moving at 30 meters per second (60 mph), and a clock has a correspondent drift is 0.25 ppm (0.25 us/sec), after approximately 11 seconds the propagation delay would exceed the cycle of uplink resource blocks. To avoid this breakdown, UE 120x may transmit SRS signals at a period of shorter than 11 seconds in the foregoing example, to correspond to the worst case mobility/clock-drift conditions.

Figure 10D:
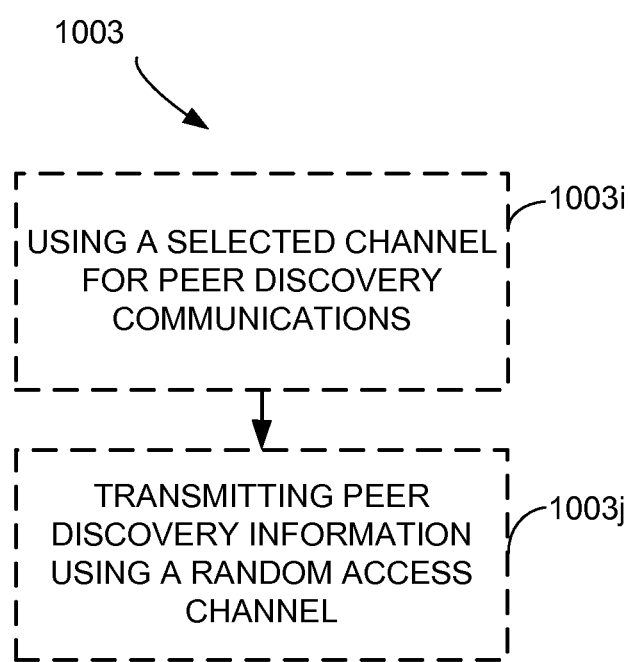

In another specific illustration of a data exchange efficiency technique, illustrated with respect to FIG. 10D, step 1003 may include use of a selected channel for uplink communications at step 1003i. This channel selection at step 1003 may be assessed by UE 120x, and may be directed based on measurements of the strength and/or quality of the communication link with the serving base station 110a and/or with peer UEs, by the overhead for communications with the serving base station 110x, and/or across peer UEs.

For example, at step 1003j, the UE 120x may indicate the use of, and/or transmit information on the uplink using, a Random Access Channel (RACH) (e.g., the LTE RACH defined by the LTE standard) for peer discovery information exchange, (and more particularly, for the transmission of peer discovery information to the base station 110a). In this case, UE 120x may transmit peer discovery information in the same way UE 120x would transmit a request for a dedicated uplink channel to the base station 110a. However, in contrast to conventional RACH protocol, instead of the UE 120x transmitting the dedicated uplink channel request, the UE 120x may transmit peer discovery information to the base station 110a on the RACH. Use of the RACH may be more appropriate when the rate of change of the UE 120x's expression and location information is relatively low, e.g., when the peer discovery information (e.g. expression information and location information) is relatively static.

For example, the UE 120x may transmit its peer discovery information to base station 110a using the RACH. Because of the small data size of the peer discovery information (on the order of at most a few hundred bits), a dedicated LTE uplink channel may not be necessary for its transmission to the base station 110a. Therefore, instead of transmitting a scheduling request, and, subsequently necessitating the expense of overhead necessary to establish a dedicated LTE uplink channel (which would be more suitable for the uplink of large amounts of data), the UE 120x may efficiently transmit the peer discovery information over the RACH.

Figure 11:
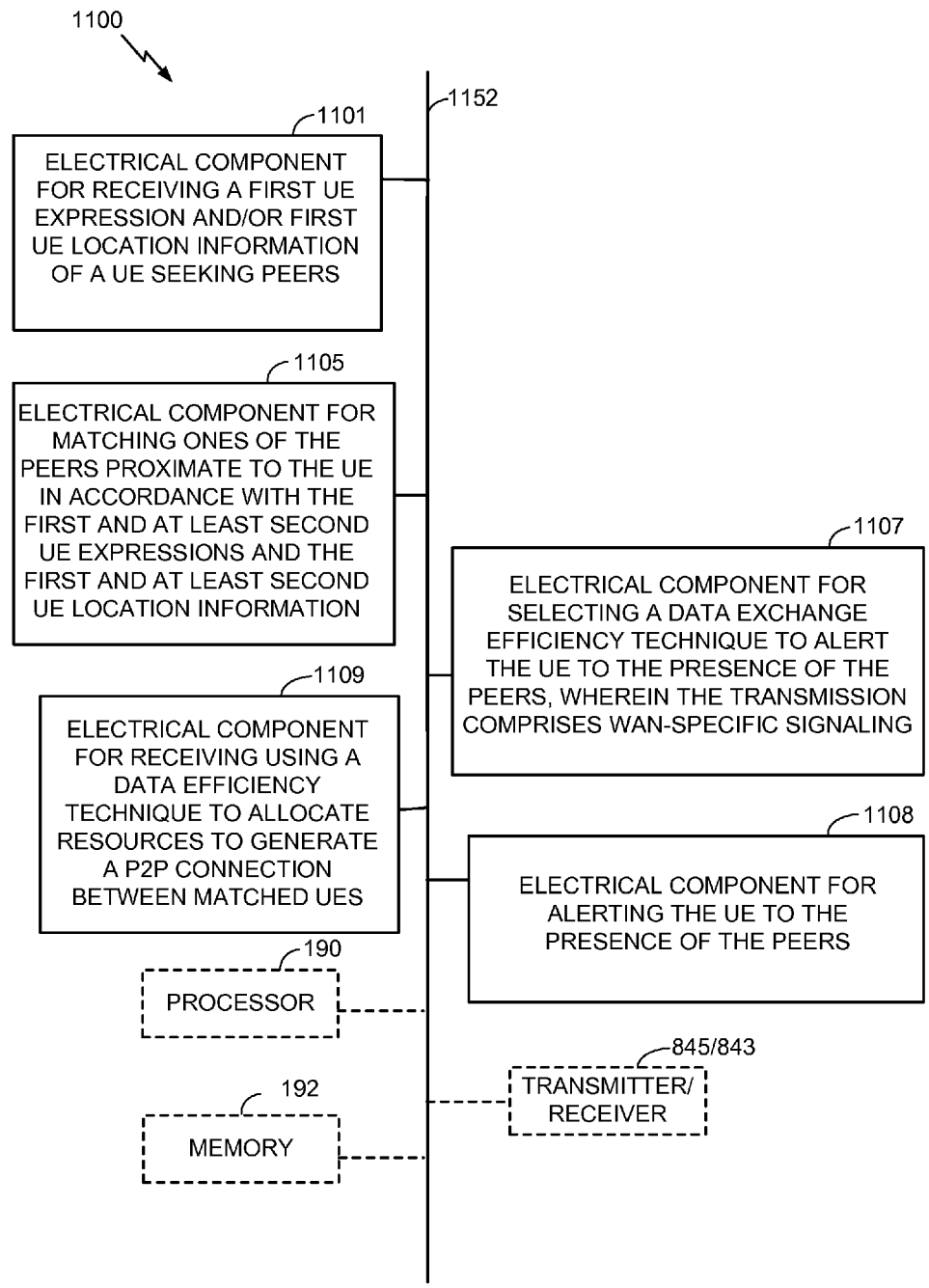
FIG. 11 is a block diagram illustrating an exemplary apparatus that may be configured as a network entity in an embodiment.

With reference to FIG. 11, there is provided an exemplary apparatus 1100 that may be configured as a network entity (e.g., base station) in a wireless network, or as a processor or similar device/component for use within the network entity. The apparatus 1100 may include functional blocks that can represent functions implemented by a processor, software, or a combination thereof. For example, apparatus 1100 may include an electrical component or module 1101 (e.g., receiver 843 of base station 110a) for receiving a first UE expression and/or first UE location information of a UE seeking peers. Electrical component or module 1101 may also receive at least one second UE expression and/or at least one second UE location information of at least one of the peers.

The apparatus 1100 may also include an electrical component or module 1105 (e.g., directory agent 140 and processor 190) for matching ones of the peers proximate to the UE in accordance with the first and at least second UE expressions and the first and at least second UE location information. Electrical component or module 1107 (e.g. efficiency module 853 of base station 110a) may be configured to selecting a data exchange efficiency technique to alert the UE via electrical component or module 1108 (e.g. transmitter 845 of base station 110a) to the presence of the peers, wherein the transmission comprises WAN-specific signaling. The apparatus 1100 may also include an electrical component or module 1109 (e.g. communication module 857 of base station 110a) for using data exchange efficiency techniques to execute (e.g., by transmitter 845 of base station 110a) an allocation of resources to generate a P2P connection between matched UEs. The electrical component or module 1109 (e.g. communication module 857 of base station 110a) may also direct, using the data exchange efficiency techniques, that the matched UEs use previously allocated P2P resources to generate a P2P connection.

By way of non-limiting example of data exchange efficiency techniques, electrical component 1107 may use the aforementioned UDP protocol, rather than the TCP/IP protocol, in the peer discovery communication between base station 110a and UEs 120x and 120y. Further, electrical component 1107 may use of a more efficient data exchange technique, in an OSI layer atypical of current use, such as in the Transport, PHY, or MAC layer. Moreover, electrical component 1107 may use the improved data exchange efficiency technique of using semi-persistent scheduling (with or without the use of an error check sum, such as the SRS referenced above) for peer discovery communications between base station 110a and UEs 120x and 120y. Yet further, electrical component 1107 may use a paging channel, i.e., a LTE non-traffic channel. Those skilled in the art will appreciate, in light of the disclosure herein, that known interactions between base station 110a and UEs 120x and 120y may likewise dictate that the electrical component 1101 and/or the electrical component 1108 use one or more of the foregoing improved data exchange efficiency techniques.

Figure 12:
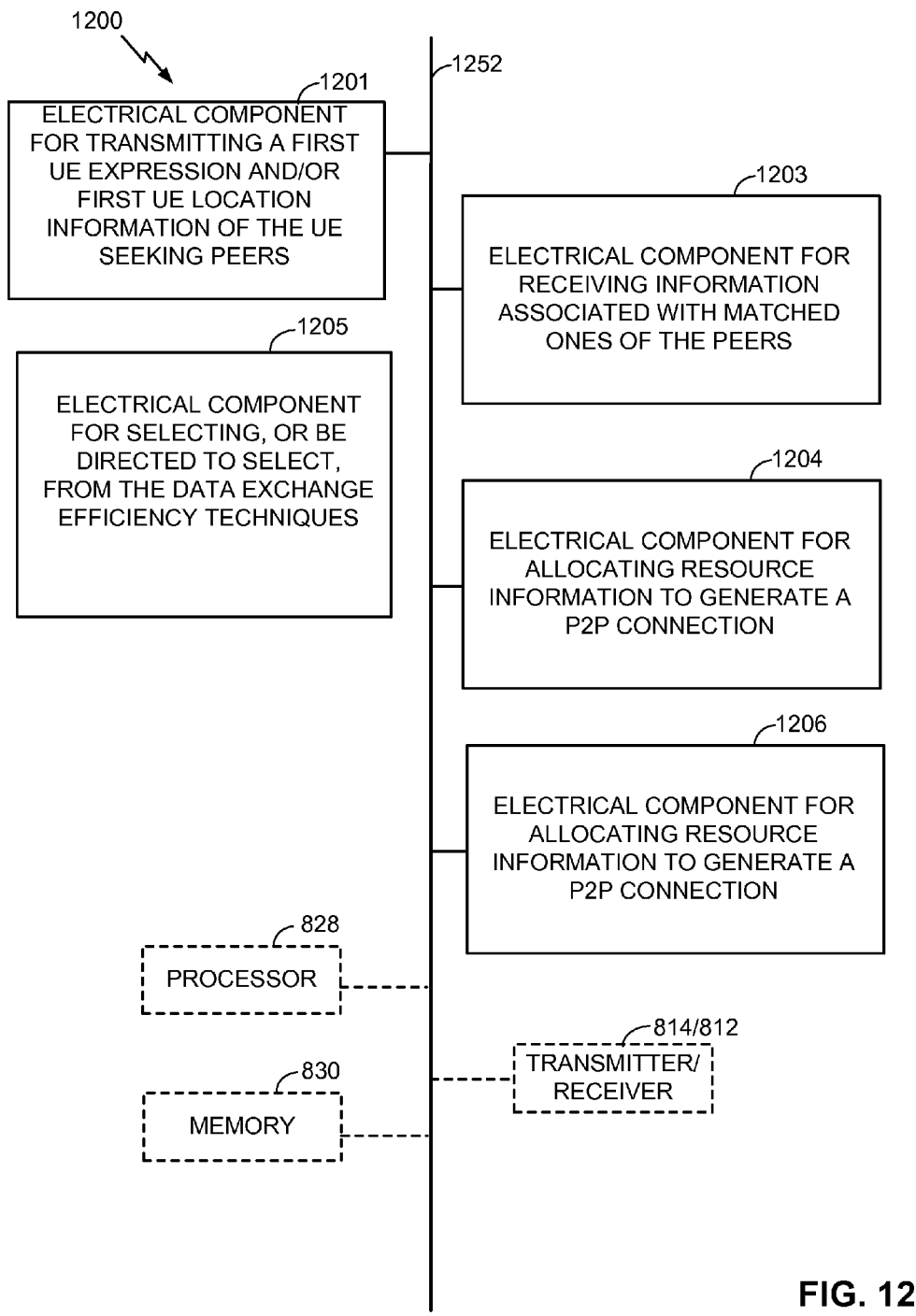
FIG. 12 is a block diagram illustrating an exemplary apparatus that may be configured as a network entity in an embodiment.

With reference to FIG. 12, there is provided an exemplary apparatus 1200 that may be configured as a network entity (e.g., a UE) in a wireless network, or as a processor or similar device/component for use within the network entity. The apparatus 1200 may include functional blocks that can represent functions implemented by a processor, software, or combination thereof (e.g. firmware). For example, apparatus 1200 may include an electrical component or module 1201 (transmitter 814 of UE 120x, for example) for transmitting a first UE expression and (or including) first UE location information of the UE 120x seeking peers, to a base station 110a. The apparatus may also include an electrical component or module 1203 (receiver 812 of UE 120x, for example) for receiving information, such as WAN-specific signaling (i.e., the effecting of a data exchange efficiency technique), associated with the matched ones of the peers, such as to cause a P2P connection to occur based on an indication from an electrical component or module 1204 (e.g. the sensing module 816 of UE 120x), in accordance with the herein described techniques to improve data exchange efficiency. For example, electrical component 1205 (efficiency module 817 of UE 120x, for example) may select, or be direct to select, from the herein disclosed data exchange efficiency techniques to receive or transmit peer discovery information, and module 1204 may accordingly allocate resource information to generate a P2P connection between the UE 120x and any matched UEs (120y).

By way of non-limiting example of data exchange efficiency techniques, electrical component 1205 may direct use of UDP protocol in the peer discovery communication between base station 110a and UE 120x. Further, electrical component 1205 may direct the use of a more efficient data exchange technique, such as UDP, in the Transport, PHY, or MAC layer. Moreover, electrical component 1205 may employ the improved data exchange efficiency technique of using semi-persistent scheduling (with or without the use of an error check sum, such as the SRS referenced above) for peer discovery communications between base station 110a and UE 120x. Yet further, electrical component 1205 may use a different communications channel, i.e., an LTE non-traffic channel. Those skilled in the art will appreciate, in light of the disclosure herein, that known interactions between base station 110a and UE 120x may likewise dictate that electrical component 1201 may also use one or more of the foregoing improved data exchange efficiency techniques.

In related aspects, apparatus 1100 and 1200 may optionally include processor components 190 and 828 respectively, which may be in operative communication with the components 1101-1109, and 1201-1206 respectively, via buses 1152 and 1252, respectively, or via similar communication coupling. The processors 190 and 828 may effect initiation and scheduling of the processes or functions performed by electrical components 1101-1109 and 1201-1206.

In other related aspects, the apparatus described herein may include a radio transmitter/receiver components 845/843 and 814/812 respectively. A stand alone receiver and/or stand alone transmitter may be used in lieu of or in conjunction with transmitter/receiver components 845/843 and 814/812, respectively. When the apparatus 1100 and 1200 is a UE or similar network entity, that apparatus may also include a network interface (not shown) for connecting to one or more core network entities. Each of these apparatus 1100 and 1200 may optionally include a component for storing information, such as, for example, a memory device/component 192 and 830. The computer readable medium or the memory component 192 and 830 may be operatively coupled to the other components of the apparatus 1100 and 1200 such as via the bus 1152, 1252 or the like. The memory component 192 and 830 may be adapted to store computer readable instructions and data for affecting the processes and behavior of the components described in each of the apparatus, and subcomponents thereof, or the processors, or the methods disclosed herein. The memory components described herein may retain instructions for executing functions associated with the components each of the components of each of the apparatus. While shown as being external to the memory components, it is to be understood that each of the components can exist within the respective memory components. It is further noted that the components in FIGS. 11-12 may comprise processors, electronic devices, hardware devices, electronic subcomponents, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of transmitting information in a long term evolution (LTE) wireless communication network, comprising:
receiving a first user equipment (UE) expression and first UE location information of a first UE seeking peers;
receiving a second UE expression and second UE location information of at least one of the peers;
in accordance with the first and second UE expressions and the first and second UE location information, matching ones of the peers proximate which are proximate to the first UE; and
transmitting information associated with the matched ones of the peers, using a data exchange efficiency technique selected based on a UE expression rate of change or based on a UE location information rate of change, to alert the first UE to the presence of the peers, wherein the transmission comprises wide area network (WAN)-specific signaling.

2. The method of claim 1, wherein using the data exchange efficiency technique includes using a paging channel when the UE expression rate of change is a first rate and includes using semi-persistent scheduling when the UE expression rate of change is a higher rate than said first rate.

3. The method of claim 2, wherein the data exchange efficiency technique comprises using unicast signaling during a time when said paging channel is used and using a broadcast channel at a different time.

4. The method of claim 1, wherein the WAN-specific signaling comprises use of a user datagram protocol (UDP) protocol.

5. The method of claim 1, wherein the WAN-specific signaling comprises a LTE non-traffic channel.

6. A method of exchanging peer discovery information in a long term evolution (LTE) wireless communication network, comprising:
selecting a data exchange efficiency technique based on a peer UE expression rate of change or based on a peer UE location information rate of change;
first transmitting, using the data exchange efficiency technique, a first user equipment (UE) expression and first UE location information by a UE seeking peers, wherein the first transmitting comprises wide area network (WAN)-specific signaling;

second transmitting, using the data exchange efficiency technique, a requested match of a second UE expression of at least one of the peers, wherein the second transmitting comprises the wide area network (WAN)-specific signaling; and receiving a match in response to the request to alert the UE to the presence of the peers.

7. The method of claim 6, wherein using the data exchange efficiency technique includes using a random access channel when the peer UE expression rate of change or the peer UE location information rate of change is a first rate and includes using semi-persistent scheduling when the peer UE expression rate of change or the peer UE location information rate of change is a higher rate than the first rate.

8. The method of claim 7, wherein the semi-persistent scheduling comprises semi-persistent scheduling with periodic sounding reference signals (SRS).

9. The method of claim 6, wherein the WAN-specific signaling comprises use of a UDP protocol.

10. The method of claim 6, wherein the WAN-specific signaling comprises a LTE non-traffic channel.

11. A base station for transmitting peer discovery information in a long term evolution (LTE) wireless communication network, comprising:
means for receiving a first user equipment (UE) expression and first UE location information of a UE seeking peers;
means for receiving a second UE expression and second UE location information of at least one of the peers;
means for matching ones of the peers proximate to the UE in accordance with the first and second UE expressions and the first and second UE location information;
means for selecting a data exchange efficiency technique based on a UE expression rate of change or based on a UE location information rate of change; and
means for transmitting information associated with the matched ones of the peers, using the data exchange efficiency technique, to alert the UE to the presence of the peers, wherein the transmission comprises wide area network (WAN)-specific signaling.

12. The base station of claim 11, wherein using the data exchange efficiency technique for the transmitting includes using a paging channel when the UE expression rate of change is a first rate and includes using semi-persistent scheduling when the UE expression rate of change is a higher rate than said first rate.

13. The base station of claim 11, wherein the data exchange efficiency technique for the transmitting comprises using a broadcast channel.

14. The base station of claim 11, wherein the WAN-specific signaling comprises use of a user datagram protocol (UDP) protocol.

15. The base station of claim 11, wherein the WAN-specific signaling consists of media access control (MAC) layer and lower layer signaling.

16. The base station of claim 11, wherein the WAN-specific signaling comprises a LTE non-traffic channel.

17. A user equipment (UE) for exchanging peer discovery information in a long term evolution (LTE) wireless communication network, comprising:
means for selecting a data exchange efficiency technique based on a peer UE expression rate of change or based on a peer UE location information rate of change;
means for first transmitting, using the data exchange efficiency technique, a first user equipment (UE) expression and first UE location information by the UE seeking peers wherein the first transmitting comprises a wide area network (WAN)-specific signaling;
means for second transmitting, using the data exchange efficiency technique, a requested match of a second UE expression of at least one of the peers, wherein the second transmitting comprises the WAN-specific signaling; and
means for receiving a match, in response to the request, to alert the UE to the presence of the peers.

18. The UE of claim 17, wherein using the data exchange efficiency technique for the first transmitting and the second transmitting includes using a random access channel when the peer UE expression rate of change or the peer UE location information rate of change is a first rate and includes using semi-persistent scheduling when the peer UE expression rate of change or the peer UE location information rate of change is a higher rate than the first rate.

19. The UE of claim 18, wherein the semi persistent scheduling comprises semi-persistent scheduling with periodic sounding reference signals (SRS).

20. The UE of claim 17, wherein the WAN-specific signaling comprises use of a user datagram protocol (UDP) protocol.

21. The UE of claim 17, wherein the WAN-specific signaling consists of a media access control (MAC) layer and lower layer signaling.

22. The UE of claim 17, wherein the WAN-specific signaling comprises a LTE non-traffic channel.

23. A computer program product, comprising:
a non-transitory computer-readable medium associated with a base station in a wireless network, comprising:
code for causing at least one processor associated with the base station to receive a first user equipment (UE) expression and first UE location information of a UE seeking peers;
code for causing the at least one processor to receive a second UE expression and second UE location information of at least one of the peers;
code for causing the at least one processor to match ones of the peers proximate to the UE in accordance with the first and second UE expressions and the first and second UE location information;
code for causing the at least one processor to select a data exchange efficiency technique based on a UE expression rate of change or based on a UE location information rate of change; and
code for causing the at least one processor to transmit information associated with the matched ones of the peers, using the data exchange efficiency technique to alert the UE to the presence of the peers, wherein the transmission comprises wide area network (WAN)-specific signaling.

24. The computer program product of claim 23, wherein using the data exchange efficiency technique for transmitting information associated with the matched ones of the peers includes using a paging channel when the UE expression rate of change is a first rate and includes using semi-persistent scheduling when the UE expression rate of change is a higher rate than said first rate.

25. The computer program product of claim 23, wherein the data exchange efficiency technique comprises using a broadcast channel.

26. The computer program product of claim 23, wherein the WAN-specific signaling comprises use of a user datagram protocol (UDP) protocol.

27. The computer program product of claim 23, wherein the WAN-specific signaling consists of media access control (MAC) layer and lower layer signaling.

28. The computer program product of claim 23, wherein the WAN-specific signaling comprises a long term evolution (LTE) non-traffic channel.

29. A computer program product, comprising:
a non-transitory computer-readable medium associated with a user equipment (UE) in a wireless network, comprising:
code for causing at least one processor associated with the UE to select a data exchange efficiency technique based on a peer UE expression rate of change or based on a peer UE location information rate of change;
code for causing at least one processor to transmit, using the data exchange efficiency technique, a first user equipment (UE) expression and first UE location information by the UE seeking peers, wherein the transmission comprises wide area network (WAN)-specific signaling;
code for causing the at least one processor to transmit, using the data exchange efficiency technique, a requested match of at least one second UE expression and at least one second UE location information of at least one of the peers, wherein the transmission comprises wide area network (WAN)-specific signaling; and
code for causing the at least one processor to receive a match, in response to the request, to alert the UE to the presence of the peers.

30. The computer program product of claim 29, wherein using the data exchange efficiency technique includes using a random access channel when the peer UE expression rate of change or the peer UE location information rate of change is a first rate and includes using semi-persistent scheduling when the peer UE expression rate of change or the peer UE location information rate of change is a higher rate than the first rate.

31. The computer program product of claim 30, wherein the semi persistent scheduling comprises semi-persistent scheduling with periodic sounding reference signals (SRS).

32. The computer program product of claim 29, wherein the WAN-specific signaling comprises use of a user datagram protocol (UDP) protocol.

33. The computer program product of claim 29, wherein the WAN-specific signaling consists of media access control (MAC) layer and lower layer signaling.

34. The computer program product of claim 29, wherein the WAN-specific signaling comprises a long term evolution (LTE) non-traffic channel.

35. A base station for transmitting peer discovery information in a long term evolution (LTE) wireless communication network, comprising:
a receiver configured to receive a first user equipment (UE) expression and first UE location information of a UE seeking peers;
the receiver being further configured to receive a second UE expression and second UE location information of at least one of the peers;
at least one processor configured to match ones of the peers proximate to the UE in accordance with the first and second UE expressions and the first and second UE location information;
select a data exchange efficiency technique based on a UE expression rate of change or based on a UE location information rate of change; and
a transmitter configured to transmit information associated with the matched ones of the peers, using the data exchange efficiency technique, to alert the UE to the presence of the peers, wherein the transmission comprises wide area network (WAN)-specific signaling.

36. The base station of claim 35, wherein using the data exchange efficiency technique to transmit includes using a paging channel when the UE expression rate of change is a first rate and includes using semi-persistent scheduling when the UE expression rate of change is a higher rate than said first rate.

37. The base station of claim 35, wherein the WAN-specific signaling comprises use of a user datagram protocol (UDP) protocol.

38. The base station of claim 35, wherein the data exchange efficiency technique for the transmitting comprises using a broadcast channel.

39. The base station of claim 35, wherein the WAN-specific signaling consists of MAC layer and lower layer signaling.

40. The base station of claim 35, wherein the WAN-specific signaling comprises a LTE non-traffic channel.

41. A user equipment (UE) for exchanging peer discovery information in a long term evolution (LTE) wireless communication network, comprising:
a component configured to select a data exchange efficiency technique based on a peer UE expression rate of change or based on a peer UE location information rate of change;
a transmitter configured to transmit, using the data exchange efficiency technique, a first user equipment (UE) expression and first UE location information by the UE seeking peers wherein the transmission comprises wide area network (WAN)-specific signaling;
a processor configured to generate a requested match of a second UE expression and second UE location information of at least one of the peers wherein the generation comprises the WAN-specific signaling; and
a receiver configured to receive a match, in response to the request to alert the UE to the presence of the peers.

42. The UE of claim 41, wherein using the data exchange efficiency technique to transmit includes using a random access channel when the peer UE expression rate of change or the peer UE location information rate of change is a first rate and includes using semi-persistent scheduling when the peer UE expression rate of change or the peer UE location information rate of change is a higher rate than the first rate.

43. The UE of claim 42, wherein the semi persistent scheduling comprises semi-persistent scheduling with periodic sounding reference signals (SRS).

44. The UE of claim 41, wherein the WAN-specific signaling comprises use of a user datagram protocol (UDP) protocol.

45. The UE of claim 41, wherein the WAN-specific signaling consists of media access control (MAC) layer and lower layer signaling.

46. The UE of claim 41, wherein the WAN-specific signaling comprises a LTE non-traffic channel.

* * * * *